(12) United States Patent
Whitenack et al.

(10) Patent No.: US 12,198,689 B1
(45) Date of Patent: Jan. 14, 2025

(54) SYSTEMS AND METHODS FOR MULTILINGUAL DIALOGUE INTERACTIONS USING DYNAMIC AUTOMATIC SPEECH RECOGNITION AND PROCESSING

(71) Applicant: Summer Institute of Linguistics, Inc., Dallas, TX (US)

(72) Inventors: Daniel Lee Whitenack, West Lafayette, IN (US); Stephen Anthony Moitozo, II, Lewiston, ME (US); Joshua John Nemecek, Vienna, VA (US)

(73) Assignee: Summer Institute of Linguistics, Inc., Dallas, TX (US)

( * ) Notice: Subject to any disclaimer, the term of this patent is extended or adjusted under 35 U.S.C. 154(b) by 72 days.

(21) Appl. No.: 17/398,826

(22) Filed: Aug. 10, 2021

Related U.S. Application Data

(60) Provisional application No. 63/063,875, filed on Aug. 10, 2020.

(51) Int. Cl.
*G10L 15/22* (2006.01)
*G10L 15/00* (2013.01)
(Continued)

(52) U.S. Cl.
CPC ............ *G10L 15/22* (2013.01); *G10L 15/005* (2013.01); *G10L 15/183* (2013.01); *H04L 65/65* (2022.05)

(58) Field of Classification Search
CPC ..... G10L 15/22; G10L 15/005; G10L 15/183; H04L 65/65
(Continued)

(56) References Cited

U.S. PATENT DOCUMENTS 6,532,446 B1 * 3/2003 King ................. G10L 15/22
704/E15.04
7,072,838 B1 * 7/2006 Ghosh ................ G10L 15/19
704/277

(Continued)

OTHER PUBLICATIONS

Dialogflow, "Documentation." Retrieved from the Internet at: <URL:https://cloud.google.com/dialogflow/docs.> (2021).
(Continued)

*Primary Examiner* — Thuykhanh Le
(74) *Attorney, Agent, or Firm* — MARSHALL, GERSTEIN & BORUN LLP; Randall G. Rueth

(57) ABSTRACT

A system includes a processor; a memory; an electronic network; an application including computing instructions configured to be executed by the processor; and a multilingual dialogue server accessible by the application, comprising a language detection model, and an automatic speech recognition model; wherein the computing instructions of the app, when executed by the one or more processors, are configured to cause the one or more processors to: receive input; analyze the input using the trained model; select a speech model; analyze the input; generate metadata; and transmit the metadata. A method includes receiving input; analyzing the input; selecting a speech model; analyzing the input; generating metadata; and transmitting the metadata. A non-transitory computer readable medium containing program instructions that when executed, cause a computer to: receive input; analyze the input; select a trained speech model; analyze the input; generate metadata; and transmit the metadata.

20 Claims, 26 Drawing Sheets

(51) Int. Cl.
*G10L 15/183* (2013.01)
*H04L 65/65* (2022.01)

(58) Field of Classification Search
USPC ........................................................... 704/253
See application file for complete search history.

(56) References Cited

U.S. PATENT DOCUMENTS

| | | | | |
|---|---|---|---|---|
| 7,330,815 | B1* | 2/2008 | Jochumson | G10L 19/0018 704/E15.047 |
| 7,983,911 | B2* | 7/2011 | Soufflet | G10L 15/30 704/235 |
| 9,368,105 | B1* | 6/2016 | Freed | G10L 15/22 |
| 9,786,279 | B2* | 10/2017 | Sharifi | G10L 15/08 |
| 9,875,740 | B1* | 1/2018 | Kumar | G10L 15/10 |
| 10,318,236 | B1* | 6/2019 | Pal | G06F 40/56 |
| 10,360,265 | B1* | 7/2019 | Agarwal | G10L 15/1815 |
| 10,395,655 | B1* | 8/2019 | Kumar | G06N 5/022 |
| 10,475,450 | B1* | 11/2019 | Wu | G06F 3/167 |
| 10,720,157 | B1* | 7/2020 | Kapila | G06Q 30/0621 |
| 10,854,191 | B1* | 12/2020 | Geramifard | G10L 15/16 |
| 10,911,910 | B2* | 2/2021 | Park | G10L 15/22 |
| 10,991,373 | B1* | 4/2021 | Wang | G06F 21/52 |
| 11,295,743 | B1* | 4/2022 | Bumberger | G10L 15/02 |
| 11,348,601 | B1* | 5/2022 | Deshpande | G06F 40/30 |
| 11,605,376 | B1* | 3/2023 | Hoover | G10L 15/22 |
| 11,694,682 | B1* | 7/2023 | Reinspach | G06Q 30/0625 704/251 |
| 11,721,332 | B1* | 8/2023 | Mokady | G06Q 30/0641 704/275 |
| 11,763,806 | B1* | 9/2023 | Chen | G10L 17/14 704/251 |
| 2004/0088162 | A1* | 5/2004 | He | G10L 15/063 704/235 |
| 2005/0165598 | A1* | 7/2005 | Cote | G10L 15/183 704/1 |
| 2009/0018826 | A1* | 1/2009 | Berlin | G10L 21/02 704/223 |
| 2009/0112594 | A1* | 4/2009 | Kim | G10L 25/78 704/254 |
| 2010/0185434 | A1* | 7/2010 | Burvall | G10L 15/005 704/3 |
| 2011/0035219 | A1* | 2/2011 | Kadirkamanathan | G10L 15/187 707/769 |
| 2011/0066433 | A1* | 3/2011 | Ljolje | G10L 15/32 704/E15.04 |
| 2011/0072466 | A1* | 3/2011 | Basso | G06F 16/73 725/47 |
| 2012/0265529 | A1* | 10/2012 | Nachtrab | G06F 40/58 704/235 |
| 2013/0132084 | A1* | 5/2013 | Stonehocker | G10L 15/04 704/244 |
| 2013/0238336 | A1* | 9/2013 | Sung | G10L 15/32 704/255 |
| 2013/0332415 | A1* | 12/2013 | Frerking | G06F 16/178 707/613 |
| 2014/0047143 | A1* | 2/2014 | Bateman | H04L 65/1069 710/72 |
| 2014/0164597 | A1* | 6/2014 | Dahan | G10L 15/22 709/224 |
| 2015/0051898 | A1* | 2/2015 | Cuthbert | G06F 40/263 704/3 |
| 2015/0053781 | A1* | 2/2015 | Nelson | G05D 23/1902 236/1 C |
| 2016/0070533 | A1* | 3/2016 | Foster | G10L 15/22 704/275 |
| 2016/0071519 | A1* | 3/2016 | Hoffmeister | G10L 15/30 704/232 |
| 2016/0179787 | A1* | 6/2016 | Deleeuw | G10L 15/22 704/9 |
| 2016/0182938 | A1* | 6/2016 | James | H04N 21/4222 704/275 |
| 2017/0011734 | A1* | 1/2017 | Ganapathy | G10L 15/005 |
| 2017/0011735 | A1* | 1/2017 | Kim | G10L 15/005 |
| 2017/0069314 | A1* | 3/2017 | Mun | G10L 15/183 |
| 2017/0116987 | A1* | 4/2017 | Kang | G10L 15/26 |
| 2018/0052826 | A1* | 2/2018 | Chowdhary | G06F 40/58 |
| 2018/0089175 | A1* | 3/2018 | Matsuoka | G06F 40/263 |
| 2018/0174580 | A1* | 6/2018 | Kim | G10L 15/197 |
| 2018/0182391 | A1* | 6/2018 | Lee | G06N 5/02 |
| 2018/0197545 | A1* | 7/2018 | Willett | G10L 15/005 |
| 2018/0286412 | A1* | 10/2018 | Amsterdam | G10L 17/06 |
| 2018/0336883 | A1* | 11/2018 | Li | G10L 15/02 |
| 2018/0336887 | A1* | 11/2018 | Song | G06N 3/045 |
| 2019/0020905 | A1* | 1/2019 | Bennett | H04N 5/917 |
| 2019/0051291 | A1* | 2/2019 | Yoo | G06N 3/045 |
| 2019/0147851 | A1* | 5/2019 | Kizuki | G10L 15/26 704/251 |
| 2019/0164552 | A1* | 5/2019 | Lim | G10L 15/28 |
| 2019/0197121 | A1* | 6/2019 | Jeon | G06F 40/56 |
| 2019/0214009 | A1* | 7/2019 | An | H04L 12/282 |
| 2019/0279613 | A1* | 9/2019 | Wheeler | G10L 15/16 |
| 2019/0304452 | A1* | 10/2019 | Kawano | G10L 25/78 |
| 2019/0304456 | A1* | 10/2019 | Hamasaki | G10L 15/22 |
| 2019/0318735 | A1* | 10/2019 | Chao | G10L 15/197 |
| 2019/0355353 | A1* | 11/2019 | Shin | G10L 15/18 |
| 2019/0385606 | A1* | 12/2019 | Won | G10L 15/30 |
| 2019/0392826 | A1* | 12/2019 | Lee | G06V 40/10 |
| 2019/0392827 | A1* | 12/2019 | Park | G10L 15/1815 |
| 2020/0005778 | A1* | 1/2020 | Kim | G06F 3/165 |
| 2020/0007916 | A1* | 1/2020 | Keen | H04N 21/26258 |
| 2020/0013396 | A1* | 1/2020 | Park | G10L 15/1815 |
| 2020/0020334 | A1* | 1/2020 | Kang | G10L 15/22 |
| 2020/0020336 | A1* | 1/2020 | Lee | D06F 34/05 |
| 2020/0027456 | A1* | 1/2020 | Kim | G06N 5/025 |
| 2020/0035228 | A1* | 1/2020 | Seo | G06F 40/295 |
| 2020/0035235 | A1* | 1/2020 | Lee | G10L 15/30 |
| 2020/0043495 | A1* | 2/2020 | Park | G10L 15/25 |
| 2020/0066254 | A1* | 2/2020 | Hiroe | H04W 4/00 |
| 2020/0126549 | A1* | 4/2020 | Tei | F24F 11/38 |
| 2020/0175960 | A1* | 6/2020 | Washio | G10L 21/0208 |
| 2020/0192986 | A1* | 6/2020 | Zhang | G10L 15/22 |
| 2020/0234693 | A1* | 7/2020 | Sung | G10L 15/22 |
| 2020/0258514 | A1* | 8/2020 | Park | G10L 15/22 |
| 2020/0285815 | A1* | 9/2020 | Zhou | G10L 15/005 |
| 2020/0302927 | A1* | 9/2020 | Andruszkiewicz | G06F 40/216 |
| 2020/0302951 | A1* | 9/2020 | Deng | G08B 1/08 |
| 2020/0321006 | A1* | 10/2020 | Honda | G10L 15/22 |
| 2020/0335083 | A1* | 10/2020 | Wan | G06N 3/044 |
| 2020/0344498 | A1* | 10/2020 | Lazar | H04N 21/234 |
| 2020/0380978 | A1* | 12/2020 | Ahn | G06F 3/167 |
| 2020/0387677 | A1* | 12/2020 | Kim | G06F 40/35 |
| 2020/0410739 | A1* | 12/2020 | Shin | G06V 10/764 |
| 2020/0412565 | A1* | 12/2020 | Sanders | H04L 12/2801 |
| 2021/0042299 | A1* | 2/2021 | Migliori | H04L 67/10 |
| 2021/0056967 | A1* | 2/2021 | Jang | G06F 3/167 |
| 2021/0074295 | A1* | 3/2021 | Moreno | G10L 15/183 |
| 2021/0110818 | A1* | 4/2021 | Kim | G10L 15/187 |
| 2021/0166678 | A1* | 6/2021 | Lee | G10L 15/22 |
| 2021/0183366 | A1* | 6/2021 | Reinspach | G10L 15/02 |
| 2021/0211104 | A1* | 7/2021 | Kim | H03F 1/305 |
| 2021/0279603 | A1* | 9/2021 | Teran Matus | G06V 20/40 |
| 2021/0358475 | A1* | 11/2021 | Shin | G06F 3/04842 |
| 2021/0358502 | A1* | 11/2021 | Kim | G10L 15/063 |
| 2022/0051664 | A1* | 2/2022 | Baror | H04M 1/72403 |
| 2022/0076672 | A1* | 3/2022 | Kanamori | G10L 15/10 |
| 2022/0222451 | A1* | 7/2022 | Shin | G10L 15/04 |
| 2022/0328039 | A1* | 10/2022 | Avijeet | G10L 15/183 |
| 2023/0053765 | A1* | 2/2023 | He | G10L 15/1815 |
| 2023/0072352 | A1* | 3/2023 | Geng | G10L 15/16 |
| 2023/0297327 | A1* | 9/2023 | Pasko | G06F 3/167 704/275 |

OTHER PUBLICATIONS

Twilio, "Power the next decade of business messaging." Retrieved from the Internet at: <URL: <https://www.twilio.com/messaging>> (2021).

* cited by examiner

740

742

```
{
  "store_id": "store1",
  "timestamp": 1623241567, # Unix time
  "accent": "andino:,
  "accent_probability": 0.894, # 0-1 float
  "asr_inference_time": 0.305, # in seconds
  "intent": "price",
  "intent_probability": 0.5285, # 0-1 float
  "sentiment": "NEU", # NEU, POS, NEG
  "language_code": "spa",
  "language_name": "spanish",
  "language_probability": 1.0,
  "lid_inference_time": 1.25, # in seconds
  "nlu_inference_time": 0.001, # in seconds
  "transcription": "¡Este budweiser es demasiado caro! También lo es el modelo.",
  "keywords": [
    "budweiser",
    "modelo"
  ],
  "incidents": [
    {
      "type": "gunshot",
      "probability": 0.82 # 0-1 float
    }
  ]
}
```

| | SECTION | WHO | SIL X CV - SIMPLE CONVO BOT CONVO TEXT |
|---|---|---|---|
| 1 | Greeting, Privacy & Rapport | Bot | Hi, I'm a chat-bot 😊 A friendly & trustworthy machine, designed to talk & help you learn more about God & faith! |
| | | Bot | If you are 16 years or older & agree with my privacy policy, I'd like to chat with you - Type "Hello" to start chatting. |
| | | User | < Any user response > |
| | | Bot | I'm happy you messaged! You aren't here by accident. Exploring God, faith or the Bible is a journey, so take your time, open your mind & be kind to yourself. Why not ask God to show himself to you. |
| 2 | Triage, Pathway & Resource | Bot | How can I help today? I can answer: 'How Can Jesus help me?' - 'How do I Pray?' - 'Watch Another Video' 'Chat with a person' |
| | | User | < Can Jesus help > | < Prayer > | < Video Watch > | < Chat > | < Other > |
| | | Bot | Good choice! Here is a helpful article about how Jesus can help you... | Good choice! Here is a great article on prayer... | Good choice! Here is another video... | Good choice! A friendly and trustworthy person will reach out to chat shortly | Sorry, I can't help with that. I can answer: 'Who Is Jesus?' - 'How Can Jesus help me?' - 'How do I talk to God?' - 'Chat with a person' |
| | | Bot | < insert url/article/chat > |
| | | Bot | Was that helpful? |
| | | User | < Any user response > |
| 3 | Follow-Up, Farewell & Loopback | Bot | I'm always here to help. Feel free to message anytime. Bye 😊 |

FIG. 10A

```
1  ## INTENT : GREET
2  - ሃይ
3  - እሙ ስላም ነሙ-
4  - ሃይ
5  - እንዳት አደርክ
6  - እንደምን አመሽህ
7  - ሃይ አዞዓ
8
9  ## INTENT : WASH
10 - እጅን እንዳት ማጠብ እንዳለብን
11 - እጅ ማጠብ ምንድን ሙ
12 - ምን ማጠብ አለብኝ?
13 - እጅን እንዳት ማፅዳት እንደለሁ?
14 - እጅን ያፅዳ
15 - እጅ በደህና እንዳት ማፅዳት እንደምቸል
16 - እጅ እንዳት እንደማጠብ
```
1300

```
1  ## INTENT : GREET
2  - HEY
3  - HELLO
4  - HI
5  - GOOD MORNING
6  - GOOD EVENING
7  - HEY THERE
8
9  ## INTENT : WASH
10 -  HOW SHOULD I WASH MY HANDS
11 -  WHAT IS HAND WASHING
12 -  WHAT SHOULD I WASH
13 -  HOW SHOULD I CLEAN MY HANDS
14 -  CLEAN MY HANDS
15 -  HOW TO SAFELY CLEAN HANDS
16 -  HOW TO WASH HANDS
17
18 ## INTENT : RESTAURANT
19 -  WHERE IS {RESTAURANT} ?
20 -  HOW DO I GET TO {MCDO}?
21
22 ## ENTITY : RESTAURANT
23 -  MACDONALDS
24 -  OLIVE GARDEN
```
1350

FIG. 13

SYSTEMS AND METHODS FOR MULTILINGUAL DIALOGUE INTERACTIONS USING DYNAMIC AUTOMATIC SPEECH RECOGNITION AND PROCESSING

CROSS-REFERENCE TO RELATED APPLICATIONS

This is a U.S. non-provisional application claiming the benefit of U.S. Provisional Application 63/063,875 filed on Aug. 10, 2020, entitled "SYSTEMS AND METHODS FOR MULTILINGUAL DIALOGUE INTERACTIONS," the entire contents of which are hereby incorporated herein by reference.

FIELD OF THE DISCLOSURE

The present disclosure generally relates to multilingual voice, text, and image driven interactions on personal computers, mobile devices, and/or edge devices; and more particularly, to techniques enabled by spoken language identification, speech recognition, and natural language understanding models.

BACKGROUND

Conventional customer or user interactions with retail checkout systems, Automated Teller Machines (ATMs), airport check-in kiosks, mobile devices (e.g., smartphones), personal computers, and similar devices are driven by touch inputs via keyboard, mouse, and touchscreen. In scenarios where a contactless interaction with these devices is desired (e.g., for infectious disease control), voice or speech driven interactions are a natural solution.

However, the performance of conventional speech technology, for recognizing audio signals, and corresponding conventional natural language understanding technology, for identifying information in speech (such as intents, mentioned entities, and sentiment), is limited by the wide variety of languages and accents spoken by natural language speakers. Application developers are often forced to build interfaces targeting a single language and accent, and they struggle to localize these interfaces to other languages and/or accents. Complicating matters even further, certain applications may need to simultaneously support multiple languages requiring users to inconveniently select a language before being able to use the applications and requiring developers to curate many conversational data assets corresponding to the multiple languages.

Furthermore, conventional speech and dialogue modeling techniques that attempt to be robust in terms of language and accent use modeling and runtime behaviors that require outsized compute resources for training, retraining and operation. Such techniques prevent deployments to hardware that allows computation to be performed by edge devices. As such, edge devices with voice or dialogue interfaces are usually monolingual and/or use large models running inference exclusively in the cloud on specialized hardware (e.g., one or more GPUs). These centralized systems prevent offline operation and rely on expensive hardware (e.g., GPUs), which is out of reach of many market participants. A final problem with conventional systems is that of bias in speech corpora. Most generally-available speech models fail miserably for a variety of accents because data has not been well-curated and is heavily weighted to majority accents.

BRIEF SUMMARY

In one aspect, a dynamic automatic speech recognition (ASR) system includes one or more processors; one or more memories; an electronic network; a digital audio processing application (app) including computing instructions configured to be executed by the one or more processors; and a multilingual dialogue server (MDS) accessible, via the electronic network, by the application, comprising: a language detection model trained to analyze digital audio input to determine one or more languages corresponding to the digital audio input, and one or more language-specific automatic speech recognition models, each trained to analyze digital audio input to detect respective speech included in digital audio; wherein the computing instructions of the app, when executed by the one or more processors, are configured to cause the one or more processors to: (i) receive digital audio input from at least one device including at least one utterance of a user; (ii) analyze the digital audio input using the trained language detection model to determine one or more languages corresponding to the digital audio input; (iii) select, based on the determined one or more languages, at least one trained speech recognition model; (iv) analyze the digital audio input using the trained speech recognition model to detect speech included in the digital audio input; (v) generate a set of metadata including 1) an identification of the determined one or more languages and 2) the detected speech; and (vi) transmit, via the electronic network, the set of metadata to a remote computing device.

In another aspect, a computer-implemented method for performing dynamic automatic speech recognition (ASR) includes (i) receiving digital audio input from at least one device including at least one utterance of a user; (ii) analyzing the digital audio input using a trained language detection model to determine one or more languages corresponding to the digital audio input; (iii) selecting, based on the determined one or more languages, at least one trained speech recognition model; (iv) analyzing the digital audio input using the trained speech recognition model to detect speech included in the digital audio input; (v) generating a set of metadata including 1) an identification of the determined one or more languages and 2) the detected speech; and (vi) transmitting, via an electronic network, the set of metadata to a remote computing device.

In yet another aspect, a non-transitory computer readable medium includes program instructions that when executed, cause a computer to: (i) receive digital audio input from at least one device including at least one utterance of a user; (ii) analyze the digital audio input using a trained language detection model to determine one or more languages corresponding to the digital audio input; (iii) select, based on the determined one or more languages, at least one trained speech recognition model; (iv) analyze the digital audio input using the trained speech recognition model to detect speech included in the digital audio input; (v) generate a set of metadata including 1) an identification of the determined one or more languages and 2) the detected speech; and (vi) transmit, via an electronic network, the set of metadata to a remote computing device.

BRIEF DESCRIPTION OF THE DRAWINGS

FIG. 7B depicts exemplary incident detection metadata, according to the present disclosure.

FIG. 10A depicts an exemplary chat bot graphical user interface, according to the present disclosure.

FIG. 13 depicts exemplary shell conversational assets, according to the present disclosure.

DETAILED DESCRIPTION

Overview

Figure 1:
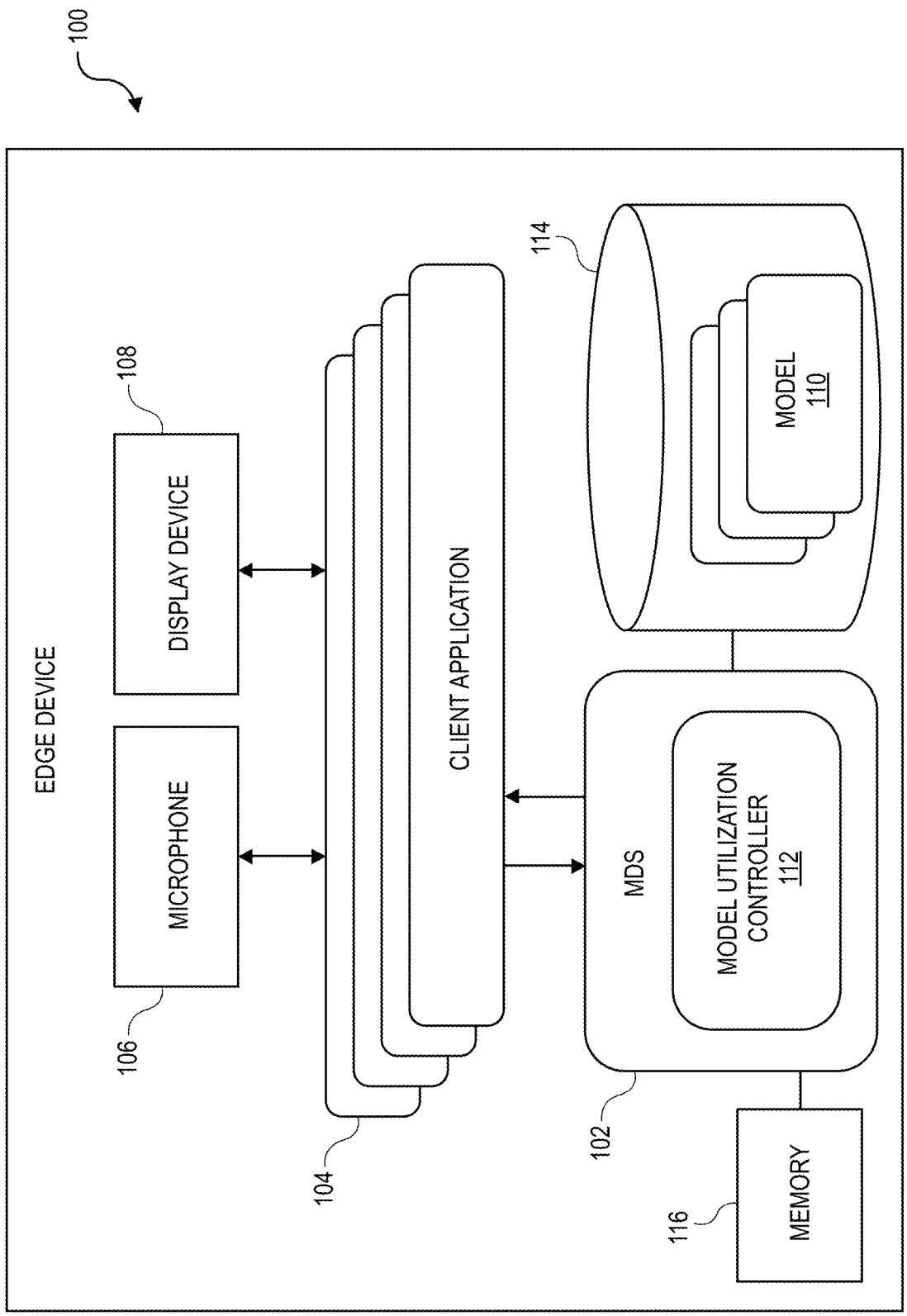
FIG. 1 depicts an exemplary edge device, according to the present disclosure.

This disclosure describes systems and methods for multilingual dialogue interactions. These systems and methods use all or a subset of spoken language identification, automatic speech recognition (ASR), and natural language understanding (NLU) to enable multilingual interactions with client devices that may be contactless, in some examples. The combination of multiple spoken language identification, ASR and/or NLU models into an audio and/or text processing pipeline may allow client devices to respond to input audio and/or text from users when that input audio and/or text corresponds to multiple natural, spoken languages and accents. Input audio and/or text (hereinafter referred to generally as user input) may be processed through multiple data processing steps that include multiple artificial intelligence (AI) models and/or machine learning (ML) models. These multiple data processing steps may be executed in various different ways depending on the detected language and/or accent of the user input. The exact flow of the user input through the data processing steps may be adjusted on-the-fly (e.g., at runtime) for each user input or subsets of user inputs based on the detected language and accent corresponding to the user input. In this manner, the performance of the automated speech recognition (ASR) and/or natural language understanding (NLU) components of the system may be increased (e.g., as measured by word error rate or accuracy) by using language and/or accent specific AI models for the ASR and/or NLU tasks. In addition, these systems and methods may allow for the resource consumption and response latency of client devices to be optimized by, inter alia, dynamically loading language and accent specific ASR and NLU models and/or only utilizing certain of the models for certain user inputs.

In one implementation, a client device interacting in a contactless fashion with a user is an edge device, such as a retail kiosk, automated teller machine (ATM), computer located at a retail checkout, airport or airline check-in kiosk, or shopping mall kiosk. The exemplary edge device may run a multilingual dialogue server (MDS) that dynamically processes the user input. The MDS may accept user input that includes audio input from a microphone or microphone array and/or camera on the edge device and/or textual input from one or more touch-driven user interfaces, such as a keyboard or touchscreen. The MDS may route the user input to an initial AI model that detects one or more natural language (e.g., English, Mandarin, Arabic, Solomon Islands Pidjin, etc.) and, in some scenarios, one or more accents (e.g., Chinese accented English, United Kingdom accented English, United States accented English, etc.). The initial AI model may output an indication including an identification of the one or more natural language and, in some scenarios, an identification of the one or more accents corresponding to the user input. The MDS may use the output indications to configure, at runtime, one or more remaining processing steps to be performed on the user input, to support generating a response to the user or to perform another action or processing task. The remaining processing of the user input may include, by way of example, a speech recognition step, a sentiment analysis step, an entity recognition step, an intent recognition step, a text classification step, a topic recognition step, a context tracking step and/or a slot filling step. In some examples, the remaining processing may include performing one or more of the steps multiple times (e.g., performing speech recognition twice and performing context tracking three times).

By having the exemplary MDS dynamically adjust/configure the processing of user input, only those AI models corresponding to the user input language and accent may be used to process the user input in some examples. In such examples, other AI models in the MDS, for languages and accents that are not needed to process the user input, are taken out of the data processing pipeline. This on-the-fly/dynamic/runtime configurability of the data processing of user input may advantageously allow the MDS to only load some of the AI models of the MDS into the edge device's memory, which loading optimizes the memory and CPU usage of the edge device. Taking some of the AI models out of the data processing pipeline may also allow the MDS to improve the latency from user input to generating a response to the user. In other scenarios, the MDS may load all of the AI models into memory, and rely on the on-the-fly configurability to improve latency and not optimize the edge device's memory usage, while still optimizing other aspects such as CPI usage. In examples wherein the edge device downloads trained AI models from a remote computing device, the dynamic configurability of the present techniques advantageously reduces network bandwidth and processing resources required of both edge and remote devices.

In some examples, the MDS may utilize compact AI models that advantageously reduce resource consumption and/or optimize latency. These compact AI models may include neural network architectures that employ one or more mechanisms to reduce the AI models' size and the speed at which the AI models' are able to perform inference. By way of example, compact neural network architectures in the MDS may replace one dimensional (1D) convolutions with 1D time-channel separable convolutions, swap certain tensor/matrix operations with operations optimized by target system architectures, quantize weight and bias values, utilize knowledge distillation, or optimize system instructions for particular computer processors. For example, as discussed below, the MDS may use a machine learning cross-compiler, toolkit and/or framework (e.g., OpenVINO, Apache TVM, etc.) to generate models targeting particular computing architectures (e.g., Intel i7, Intel i9, AMD processors, GPUs, etc.). In another implementation, the client device interacts in a contactless fashion with the user. The client device may be a personal computing device, such as a laptop computer, desktop computer, smartphone, or tablet computer. In an embodiment, the MDS may run on the client device or on a computer separate from the client device (e.g., a virtual machine in the cloud) that communicates with the client device over a network connection, such as an Internet connection. In some examples, the functions of the MDS and/or the MDS components may be split between a client-side software application running on the client device and a remote software application running on a computer separate from the client device. The user input from the client device may include audio and text input that is communicated to the MDS on the client device or on the remote computer, and the MDS may configure further data processing steps to be performed on the user input on-the-fly based on a detected language and/or accent corresponding to the user input.

After processing the user input, some implementations of the MDS (whether operating on an edge device, personal computing device, or with functionality spread between a client device and remote computer) generate a user response and metadata corresponding to the user input. The user response may be a textual, voice, image and/or multimodal response matched to the user input based on some combination of language, accent, detected user intent, detected entities in the user input, detected sentiment of the user input and/or detected context or state information in the user input along with supplemental information about geography, time of day, weather, products and/or other user input-independent/supplemental information. The metadata generated by the MDS in response to the user input may include, among other things, an indication of a language, an accent, one or more intents corresponding to the user input, one or more entities included in the user input, one or more sentiments corresponding to the user input, one or more contexts corresponding to previous user inputs, and one or more textual representations of the user input.

The user response and metadata generated by the exemplary MDS may be generated by one or more NLU models that are part of a multilingual NLU (MNLU) engine in the MDS. The MNLU utilizes one or more NLU models. The NLU models may be trained, or fit, in an offline or online fashion by a ML training module transform input representations of text in one of multiple languages or multiple languages at one time into numerical indications of user intents, sentiments, emotions, entities and/or keywords corresponding to the input representations of text. In certain scenarios, one or more individual NLU models in the MNLU may be configured to process data from multiple languages. In other scenarios, the MNLU may include multiple NLU models, each of the NLU models being able to process one of the multiple languages supported by the MNLU. The one or more NLU models in the MNLU may be multilingual and/or multiple monolingual NLU models for, by way of example, text/intent classification, named entity recognition (NER), sentiment analysis, coreference, reading comprehension, text generation, feature extraction, summarization, mask filling and/or automated knowledge base construction.

In some implementations, the MNLU engine is configured/trained based on curated multilingual dialogue training data curated using a Multilingual Dialogue Data Curation System (MDDCS). The exemplary MDDCS includes a MDDCS server and an MDDCS client application. Users curating multilingual dialogue data may interact with the MDDCS client application to (i) create a shell conversation; (ii) create training examples for the shell conversation; (iii) translate the shell conversation into one or more languages other than the language of the shell conversation; and (iv) translate the training examples for the shell conversation into one or more languages other than the language of the shell conversation. The MDDCS server may receive data corresponding to the (i)-(iv) interactions and store the data in a datastore (e.g., an electronic database). The MDDCS server may also pre-process and format the data received from the MDDCS client application such that an implementation of the MNLU can use the data to train multilingual and monolingual NLU models. Implementations of the MNLU may then utilize the data curated by the MDDCS including, in some examples, conversation assets and training examples in multiple languages, to train or fit the multilingual NLU models in the MNLU.

Exemplary Systems

FIG. 1 shows an example edge device 100 running a Multilingual Dialogue Server (MDS) 102 to enable contactless, multilingual dialogue interactions. In some scenarios, the edge device 100 may be a kiosk device in an airport, retail shopping environment, shopping mall, hotel, bank, stadium, conference center, or other similar location where users may interact with a kiosk. Generally, however, the edge device 100 need not be a kiosk device, but the edge device 100 could be any computer device configured to enable automated customer, employee or visitor interactions and/or automated speech-based analytics at a physical location of a company or organization or a publicly accessible location, such as a park, train station, bus stop, market, or community center. In some deployments, the edge device does not communicate with an end user, and rather, reports analytics. The edge device 100 may be situated in a public setting wherein the edge device 100 may be used by any member of the public, and/or in a private setting, wherein access to the edge device 100 is restricted in some fashion (e.g., the edge device 100 may be usable by those having a building keycard). For example, in a high rise building, a first edge device 100 may be located in the public lobby, and a second edge device 100 may be configured in a private office space or private space behind a retail checkout counter or another retail setting.

The edge device may include a message broker that is located within the edge device 100 or outside the edge device 100. The message broker may be configured to send and receive data and/or metadata to and from the edge device 100. Additional examples of using message brokers with the present techniques are discussed further below.

In some examples, the edge device 100 may be configured to stream data between components within the edge device 100 and/or outside the edge device 100 using, for example, a streaming data protocol (e.g., Real Time Streaming Protocol (RTSP)), HTTP, and/or another protocol. For example, the edge device 100 may stream audio data (e.g., a WAV, FLAC or MP3 stream) from the microphone 106 to the client application 104. The client application 104 may control the capture of audio from the microphone 106 via an RTSP link or via another protocol. The client application 104 may cache the streamed data in the memory 218 for concurrent or delayed processing (e.g., by another client application 204 instance, a co-routine, a thread, a separate process, etc.). In some examples, the streamed data may be immediately offloaded to another device by redirecting the streamed data as messages destined to the message broker. In some examples, the streamed audio may be processed by one or more models before being stored in the memory 218, and the output of the models stored and/or transmitted via the message broker. In some examples, after processing, the streamed audio data may be discarded.

The edge device 100 may enable user interactions with the edge device 100 via one or more client applications 104, a microphone 106, and a display device 108. The client applications 104, the microphone 106, and the display device 108 may, by way of example, allow the user to talk to the edge device 100 to complete purchases, check-in to flights, view a map of an airport, get directions to a gate within an airport, check-in or check-out at a hotel, purchase tickets for a bus or train, gain entry to a sporting event, locate a talk at a conference, view a conference schedule, find exhibitors at a conference, etc. Each of the client applications 104 is a software application that collects user input in the form of audio spoken language or voice commands via the microphone 106 and responds to users on the display device 108. The microphone 106 may be a single microphone, an array of microphones configured to enhance audio via techniques such as beamforming, or one or more microphones integrated into a camera device. The microphone 106 may also be a device external to the edge device 100 but connected edge device via one or more cords (e.g., a USB cord), an audio interface, or a wireless connection (e.g., Bluetooth). The display device 108 may be any computer display including touchscreen and non-touch screen computer displays.

For example, one of the client applications 104 may be a voice capture application 104 that records speech of the user as one or more utterances via the microphone 106 represented in a digital audio format (e.g., in a WAV file). The edge device 100 may store the utterances in a memory of the edge device 100 (e.g., in a solid state drive, in volatile memory, etc.). The voice capture application 104 may include instructions for varying the sensitivity of the microphone input and for performing other functions for more accurately capturing the utterance of the user. The client applications 104 may include instructions for pre-processing the digital audio user input.

The edge device 100 may include one or more processors (e.g., a GPU, a CPU, a TPU, an FPGA, etc.). In some examples, the edge device may use more advanced processing instructions to accelerate execution of ML and AI models (e.g., a set of GPU instructions). In some cases, one or more newer generation hardware/instructions that are optimized for edge computation may be used, such as an edge Video Processing Unit, Edge TPU, Nvidia Jetson GPU, etc. Using such newer generation hardware/software may advantageously allow inference to be performed in the edge device 100 in a more efficient way.

The client applications 104 may communicate digital audio user input or a pre-processed audio user input along with metadata to the MDS 102. An HTTP API (e.g., a REST API or other API) served by the MDS 102 may facilitate this communication. In response to requests (i.e., communicated audio and/or metadata) the MDS 102 may analyze the audio user input to perform language identification, accent identification (e.g., German accented English, Chinese accented English, UK accented English, etc.), speech-to-text and/or automated speech recognition, user intent identification, entity identification, sentiment analysis, and/or other natural language understanding (NLU) tasks.

Exemplary Computer-Implemented Natural Language Identification

The MDS may provide language identification information as described in Ethnologue, https://www.ethnologue.com/about/language-info, and hereby incorporated by reference in its entirety. For example, the MDS may express language identification using an anglicized form of the name used to refer to that language in a given country. In some cases the name may correspond to the ISO 639-3 reference name associated with the ISO 639-3 code. In other cases, the identified name may be the most well-known English (or anglicized) name associated with the language. Names may be recorded using English spellings, though diacritical marks may be included. For some language names in southern Africa special symbols are used to represent the click sounds produced with ingressive mouth air. A language subtitle may identify a primary country for the language. When a language is spoken in more than one country, the MDS may identify one of the countries as primary (e.g., a country of origin). In cases where the language is indigenous in multiple countries, the MDS may designate the country having the most users as primary.

The ISO 639-3 code assigned to the language by the ISO 639-3 standard (ISO 2007) may be given in lower-case letters within square brackets. When a given language is spoken in multiple countries, all of the entries for that language use the same three-letter code. The code distinguishes the language from other languages with the same or similar names and identifies those cases in which the name differs across country borders. These codes advantageously ensure that each language is counted only once in world or area statistics. Many languages are known by or have been referenced in the literature by more than one name. Alternate names come from many diverse sources: speakers may have more than one name for their language, or neighboring groups may use different names. Other names may have been assigned by outsiders and used in ethnographic or linguistic publications before the name used by the speakers themselves was known. Another source of alternate names is variant spellings of what is essentially the same name. In many cases, spellings used in languages of wider communication or in regional languages are also included in the list. Some names may identify the ethnic group or place names that have been used in the literature as names for the language. Some names, used in the past or in use by others, are pejorative and offensive to the speakers of the language. Those are identified, wherever they are listed, by enclosing the name in double quotation marks and appending the label pej. (pejorative) following the name. Such names may be included as a means of helping users find languages they may have only heard of or seen referred to by such names. Some language names may be autonyms (i.e., the "self name"), or, the name of the language in the language itself. Furthermore, the form given is a standard spelling within the writing system of the language, which means that this field is never reported for an unwritten language. When the script is non-Roman or contains unusual characters, a Romanization of the name may be given in parentheses.

The MDS language identification may include a code assigned to the language by the ISO 639-3 standard and may include a list of alternate or other names that have been used to refer to the language. The MDS language identification may include a user population that gives the number of people in a country who use the language, plus the total number of users worldwide if the language is used in multiple countries. The user populations may be broken down into first and second language users. The language identification may include monolingual population, ethnic population, and other comments about population. Location may describe geography of one or more regions where the language users are located within the country. The language identification may include an Expanded Graded Intergenerational Disruption Scale (EGIDS) level for the language in a country and describes the level of official recognition, if any. If the language is associated with an officially recognized nationality or ethnic group, that association may be included.

The MDS language identification may include a language classification. For example, the language classification may include one or more dialects listing the names that have been used to refer to varieties of the language, as well as giving information about dialect relations in terms of intelligibility and lexical similarity with other varieties if available. The dialects information may include macrolanguage information. The MDS language identification may include typological information, including brief descriptions of basic word order, significant phonological, morphological, and syntactic features, and other matters of interest to linguists and language use information include domains of use, age of speakers, and viability and patterns of use, the use of other languages by this language community and the use by others of this language as a second language. The MDS language identification may include language development information including literacy rates, use in education, language documentation and development products, revitalization efforts, and language development agencies. Other information may be included, such as user population data, country user population, extinct language, typology, etc.

Exemplary Model Composition, Training and Operation

One or more models 110 enable at least some of the operations of the MDS 102, such as the language identification, accent identification, speech recognition and/or NLU operations. Each of the one or more models 110 may be an individual or ensemble of artificial intelligence (AI), machine learning (ML) and/or statistical learning models. By way of example, the one or more models 110 may include neural networks, capsule networks, decision trees, random forests, support vector machines, k nearest neighbors, regressions, autoregressions, gradient boosting, naive Bayes methods, or similar types of ensembles of these models. Each of these models may be stored in a serialized format on a data storage device 114 of the edge device 100. The data storage device 114 may include any data storage media common to computer devices such as hard disk drives, solid state drives, flash drives, and SD cards.

Based on the user input from the client applications 104, the MDS 102 may employ a model utilization controller 112 to control which of the models 110 is used in processing the user input from the client applications 104. In certain scenarios, the model utilization controller 112 uses a first of the models 110 to detect the language and/or accent corresponding to the user input or pre-processed user input from the client applications 104. The model utilization controller 112 then uses the results of the language and/or accent detection to determine a subset of the models 110 to load into a memory 116 of the edge device 100, such that the MDS 102 can use the in-memory subset of the models 110 in other operations related to processing the corresponding user input. In other scenarios, all or most of the models 110 may already be loaded into the memory 116, and the model utilization controller 112 may use the result of the language and/or accent detection to determine, on-the-fly/at runtime, a subset of the models 110 that are already in the memory 116, such that the MDS 102 can use the in-memory subset of the models 110 in other operations related to the processing the corresponding user input.

Once a user input from the client applications 104 has been processed by logic in the MDS 102 including usage of at least a subset of the models 110, the MDS 102 responds to the client applications 104 with results of processing the user input and/or corresponding metadata. The MDS 102 may communicate the results and/or metadata back to the client applications 104 as a response payload via the same API used by the client applications 104 to communicate the user input or by a separate API or interface. The results and/or metadata may include, by way of example, data representing the text corresponding to audio user input, one or more intents corresponding to the user input, one or more entities corresponding to the user input, one or more sentiments corresponding to the user input, one or more detected languages, one or more detected accents, one or more timestamps, one or more audio properties, one or more writing system scripts and/or information about the detected language as discussed above.

Exemplary Client-Server Implementation

Figure 2:
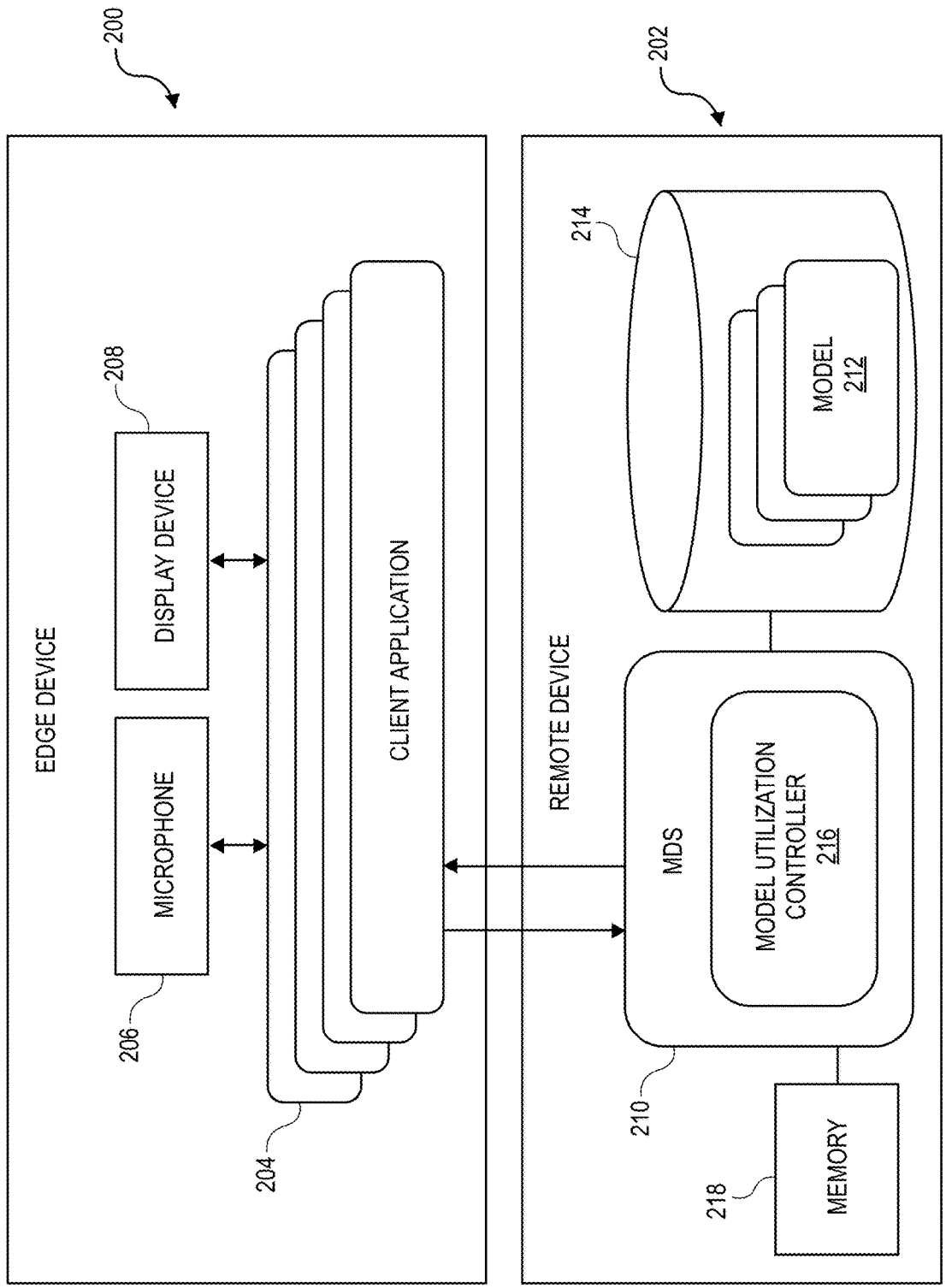
FIG. 2 depicts an exemplary edge device in communication with a remove device, according to the present disclosure.

FIG. 2 shows another example system in which an edge device 200 is in communication with a remote device 202, corresponding to the edge device 100 of FIG. 1 being separated into a client-server configuration. In this and similar implementations, the edge device 200 may be a kiosk device in an airport, retail shopping environment, shopping mall, hotel, bank, stadium, conference center, or other location where users may approach a kiosk. Generally, however, the edge device 200 need not be a kiosk device, but the edge device 100 could be any laptop or desktop computer, tablet computer, or smartphone configured to enable automated customer, employee or visitor interactions via voice or to enable automated speech-based analytics.

In some examples, the edge device 200 may enable user interactions with the edge device 200 via one or more client applications 204, a microphone 206, and a display device 208. The client applications 204, the microphone 206, and the display device 208 may, by way of example, allow the user to talk to the edge device 200 to complete purchases, check-in to flight, view a map of an airport, get directions to a gate within an airport, check-in or check-out at a hotel, purchase tickets for a bus or train, gain entry to a sporting event, locate a talk at a conference, view a conference schedule, find exhibitors at a conference, make phone calls, navigate third party applications, browse the Internet, or perform any other interaction including a user utterance. Each of the client applications 204 may be a software application that collects user input in the form of audio spoken language or voice commands via the microphone 206 and responds to users on the display device 208. The microphone 206 may be a single microphone or an array of microphones configured to enhance audio via techniques such as beamforming. The display device 208 may be any computer display including touchscreen and non-touch screen computer displays.

In some examples, the edge device 200 the microphone 206 may collect audio data from one or more users in a passive mode. The audio data collected in the passive mode may be stored and/or analyzed (e.g., for analytics and/or data processing purposes). In some cases, the processing of the data collected passively may be performed by the edge device 200 and/or the remove device 202 offline, e.g., for the purpose of labeling the collected audio, for gathering statistical data, for performing incident detection, etc., The client applications 204 may communicate audio user input or a pre-processed audio user input along with metadata to the remote device 202, which server includes a multilingual dialogue server (MDS) 210 that may correspond to the MDS 102, in some examples. A REST API or other API served by the MDS 210 may facilitate this communication over a private or public network, such as the Internet. The remote device 202 may include one or more virtual machines managed by a cloud provider or the remote device 202 may be one or more computers, rack mount servers, or virtual machines managed by parties other than cloud providers (e.g., the organization or company operating the MDS 210 or partner organizations of the organization or company operating the MDS 210).

In some examples, the remote device 202 may include a message broker (not depicted). The message broker may be implemented as a message queue, a message broker, a PubSub network protocol, an MQTT protocol, etc. The message broker may be thought of as a message sink to which any data may be pushed, or written, by the edge device 200. Another device or process may then retrieve messages from the message broker asynchronously, treating the message broker as a data source. Like the edge device 100, the edge device 200 may be configured to receive an audio/video stream from a device, such as the microphone 206, a camera, etc.

In response to requests (i.e., communicated audio and metadata), the remote device 202, the MDS 210 may perform language identification corresponding to the audio user input (e.g., English, Mandarin, Arabic, etc.), accent identification corresponding to the audio user input (e.g., German accented English, Chinese accented English, UK accented English, etc.), speech-to-text or automated speech recognition on the audio user input, identification of one or more user intent from the audio user input, identification of one or more entities mentioned in the audio user input, identification of a sentiment corresponding to the audio user input, and/or other natural language understanding (NLU) tasks. The processing performed by the MDS 210 may correspond to the processing performed by the MDS 102, above.

One or more models 212 enable at least some of the operations of the MDS 210, such as the language identification, accent identification, speech recognition, and NLU operations. The models 212 may correspond to the models 110 described above. Each of the one or more models 212 may be an individual or ensemble of artificial intelligence (AI), machine learning, or statistical learning models. By way of example, the one or more models 212 may include neural networks, capsule networks, decision trees, random forests, support vector machines, k nearest neighbors, regressions, autoregressions, gradient boosting, naive Bayes methods, or similar types of ensembles of these models. Each of these models is stored in a serialized format on a data storage device 214 of the remote device 202. The data storage device 214 may include any data storage media common to computer devices such as hard disk drives, solid state drives, flash drives, and SD cards. The data storage device 214 may also be a data storage device external to the remote device 204, such as a remote database, object storage service, or similar connected to the remote device 204 via a volume mount, API connection, or FTP link.

Based on the user input from the client applications 204, the MDS 210 employs a model utilization controller 216 to control which of the models 212 is used in processing the user input from the client applications 204. In certain scenarios, the model utilization controller 216 uses a first of the models 212 to detect the language and/or accent corresponding to the user input or pre-processed user input from the client applications 204. The model utilization controller then uses the results of the language and/or accent detection to determine a subset of the models 212 to load into a memory 218 of the remote device 202, such that the MDS 210 can use the in-memory subset of the models 212 in other operations related to processing the corresponding user input. In other scenarios, all or most of the models 212 may already be loaded into the memory 218, and the model utilization controller 216 uses the result of the language and/or accent detection to determine a subset of the models 212 that are already in the memory 218, such that the MDS 210 can use the in-memory subset of the models 212 in other operations related to the processing the corresponding user input. In this way, the model utilization controller 212 can be configured to improve the latency at which the client applications 204 can respond to user input.

Once a user input from the client applications 204 has been processed by logic in the MDS 210 including usage of at least a subset of the models 212, the MDS 210 responds to one or more of the client applications 204 with results of processing the user input and/or corresponding metadata. The MDS 210 may communicate these results and/or metadata back to the client applications 204 via the same API and network used by the client applications 204 to communicate the user input or a separate API or interface. The results and/or metadata may include, by way of example, data representing the text corresponding to audio user input, intents corresponding to the user input, entities corresponding to the user input, sentiment corresponding to the user input, detected languages, detected accents, timestamps, audio properties, writing system scripts, and information about the detected language.

Exemplary Multilingual Dialogue Server

Figure 3:
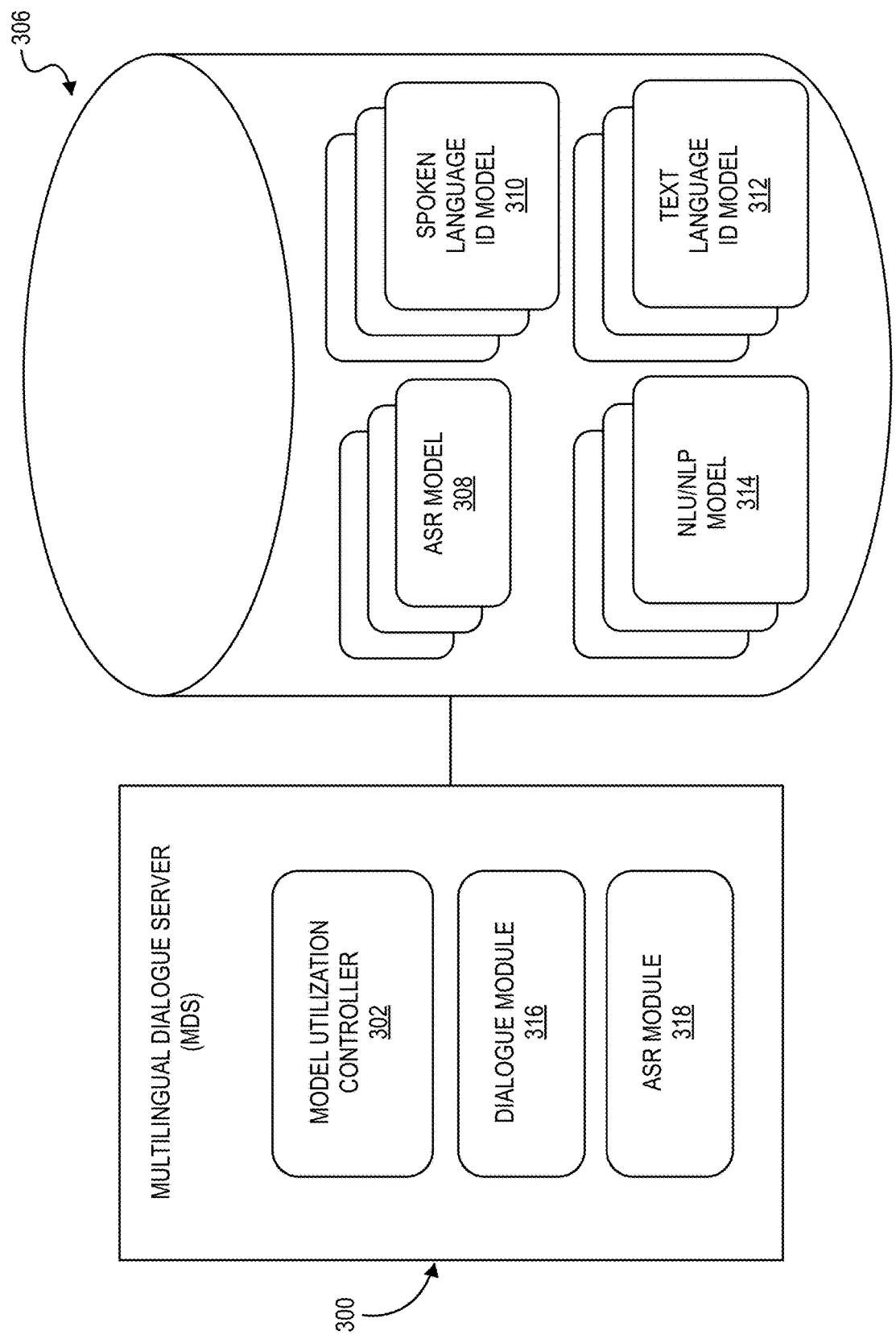
FIG. 3 depicts a multilingual dialogue server communicatively coupled to an exemplary datastore, according to the present disclosure.

FIG. 3 shows an example implementation of a Multilingual Dialogue Server (MDS) 300. The MDS 300 may be used in a system similar to that illustrated in FIG. 1 or FIG. 2 and may correspond to the MDS 102 or MDS 210, respectively. The MDS 300 may be used in both client-server and/or a solo client or solo server configuration, in some examples and scenarios. In some examples, the MDS 300 may operate independently or in different kinds of systems. The MDS 300 may be configured to perform the various AI-driven operations described herein including but not limited to language/accent identification, speech recognition and dialogue. The MDS 300 may comprise one or more computer programs written in one or more programming languages, such as Python, Go, Swift, C/C++, etc. Other applications or users may interact with the MDS 300 using a variety of mechanisms. In some scenarios, users or client applications may interact with the MDS 300 using a REST API, GraphQL API, or other API protocol. In other scenarios, users or client applications may interact with the MDS 300 via a language library, such as a Python library distributed via a PyPi server, a Go package, a JavaScript library, or similar. The MDS language library may include a software development toolkit (SDK), framework or other software packages provided by the owner/operator of the MDS.

The MDS 300 includes a model utilization controller 302 which operates to advantageously optimize the resource consumption and performance of the MDS 300 by dynamically loading or configuring usage of subsets of models stored in a data store 306 by an ASR module 318 and dialogue module 316. The MDS may be run on an edge device (e.g., a kiosk device and/or a computer located at a retail checkout), and the dynamic configurability allows the edge device (e.g., the edge device 200) to avoid running every ASR model each time an audio input is analyzed. This efficiency results in significant performance increases over conventional techniques. Specifically, the present techniques are able to detect language and accent initially, and to defer inference using one or more ASR model to produce respective text output for other purposes (e.g., dialogue interaction) until later.

The models stored in the example data store 306 include one or more ASR models 308, one or more spoken language identification models 310, one or more text language identification models 312, and one or more Natural Language Understanding and/or Natural Language Processing (NLU/NLP) models 314. Each of the ASR models 308, the spoken language identification models 310, the text language identification models 312, and the NLU/NLP models 314 may be stored in the form of one or more files in the data store 306. These files may include files in the format of, by way of example, pickle, protobuf, Caffe model, MXNet model, ONNX, XML, text, JSON, or other file formats used to serialize AI, ML and statistical models.

Each of the spoken language identification models 310 may include a single neural network or non-neural network model. Each of the spoken language identification models 310 may include an ensemble of models. In any event, each of the spoken language identification models 310 is configured to enable the MDS 300 to take a representation of digital audio as input including one or more user utterances and output an indication of the language or languages corresponding to the input audio. For example, the digital audio input may correspond to that collected by the microphone 106 of the edge device 100 or the microphone 206 of the microphone 206 of the edge device 200. In some implementations, the spoken language identification models 310 may allow the MDS 300 to identify an accent or dialect associated with the input audio in addition to or instead of language(s). The representation of audio that is input to each of the spoken language identification models 310 could, by way of example, be a raw audio file (e.g., an mp3 or wav file), a stream of audio bytes (e.g., via a web socket connection), and/or a Mel spectrogram. This representation of audio is transformed by layers of the language identification models 310. Example transformations of the representation of the audio include multiplications with coefficients, or weights; additions of constant terms, or biases; application of linear and non-linear functions; concatenations; convolutions; normalizations; and clipping. When utilized by the MDS 300, the output of the spoken language identification models, after transforming the input representation of the audio, is a numerical indication of a language/accent class or a string class label corresponding to a language or accent, such as an ISO 639-3 code, a Registry of Dialects code, or similar.

By way of example, the spoken language identification models 310 may include neural network models with combinations of layers including convolutional, normalization, dropout, fully connected, recurrent (e.g., LSTM or GRU), attention, self-attention, multi-layer perceptron or other known neural network layers. The spoken language identification models 310 may also include non-neural network models operating on audio features to classify input representations of audio into one or more languages or accents. These non-neural network models may include decision trees, random forests, gradient boosted models, logistic regression models, conditional random field models, support vector machines, or similar. As noted, language detection may be dependent on accent detection. The present techniques improve over conventional techniques that do not discern, for example, between mainland-accented Mandarin as opposed to Taiwanese-accented Mandarin by allowing a separate language identification model 310 to be trained to identify each accent.

Each of the ASR models 308 may be a single neural network or non-neural network model configured to take audio as input and output a textual representation of the words and sounds spoken in the audio input. Each of the ASR models 308 may also be an ensemble of models including lexicons, acoustic models, and language models. Similar to the spoken language identification models 310, the ASR models 308 operate on an input representation of audio. However, the ASR models, when loaded and utilized by the MDS 300, allow the MDS 300 to convert input audio representations into text for the purposes of, e.g., speech recognition. Model loading may depend upon the chosen embodiment. For example, in some examples, the MDS 300 may load all models into memory and use them selectively. In some examples, the MDS 300 may load one or more models into memory selectively, and use some or all of them.

In many scenarios, each of the ASR models 308 may be created using a training or fitting process for a particular language and/or accent of a language. The training or fitting process involves optimization of the model's set of parameters based on an iterative update scheme, such as gradient descent, stochastic gradient descent, mini-batch gradient descent, adam optimization, novgorod, or similar, iterating over the training samples. In certain implementations, these training samples include samples corresponding to only one language and/or one accent. In other implementations, the training process may include multiple phases. A first phase of such a training process may include training parameters on data from a linguistically related language or accent of a language, and then a second phase of the training process may include fine-tuning or transfer learning those parameters on the target language and/or accent.

In some implementations, the ASR models 308 include model architectures that are specifically optimized to reduce resource consumption of the MDS 300. For example, the ASR models 308 may include models that take larger models (e.g., Jasper or WaveNet models) and replace certain neural units or layers with others that are more beneficial in terms of storage, memory, or execution time. By way of example, QuartzNet models may be used to replace one dimensional (1D) convolutions in a Jasper model with 1D time-channel separable convolutions. Such modification advantageously allows the ASR models, in these implementations, to have smaller parameter sets and thus take up less storage and memory and execute faster than larger models. In some examples transfer learning may be used to develop the ASR model architecture. For example, an existing general purpose ASR model may fail to identify accents. The present techniques may include instructions for modifying the general purpose model using transfer learning, to build additional capabilities into the general purpose model, saving time and computation resources in the process.

Each of the NLU/NLP models 314 and each of the text language identification models 312 may be a single neural network or non-neural network model configured to take a representation of text as input and output an indication of a class or numerical score/measure associated with the input text. The input representation of text may be raw text in any known writing system script (Latin, Cyrillic, Georgian, etc.), or the input representation may be an encoded or embedded representation including, by way of example, learned word embeddings (GloVe, Word2Vec, BERT, GPT-2, etc.), bag of words, subwords, byte pair encodings, one hot encodings, TF-IDF vector, etc., The output of the NLU/NLP models 314 depend on the task for which the MDS 300 was configured.

In example cases where the MDS 300 was configured for supporting multilingual dialogue interactions, the NLU/NLP models 314 include at least some of intent recognition, named entity recognition, sentiment analysis, reading comprehension, topic classification, text generation, and text summarization. Some or all of the NLU/NLP models 314 may be multilingual models. That is, some or all of the NLU/NLP models 314 may be trained or fit in a model training process using multilingual data for the respective model's task (e.g., NER or text classification). Some or all of the NLU/NLP models 314 may also be monolingual models trained or fit in a model training process using monolingual data for the respective model's task.

When processing input audio, the example MDS 300 may employ the model utilization controller 302 to configure the dialogue module 316 and the ASR module 318 on-the-fly/at runtime based on an identified language and/or accent corresponding to the input audio. The ASR module 318 and dialogue module 316 then use this configuration corresponding to the input audio to perform corresponding tasks. The configuration involves one or both of: (i) setting one or more function arguments, elements of metadata, or variables utilized by the dialogue module 316 and the ASR module 318 indicating the language and/or accent corresponding to the input audio; and (ii) loading or causing the dialogue module 316 or ASR module 318 to load a subset of the models stored in the data store 306 into the memory of the device on which the MDS 300 is operating.

It should be appreciated by those of ordinary skill in the art that in some examples, a proprietor of the present techniques may allow a third party to provide some or all of the models that are used by the MDS. For example, the MDS 300 may be partially user-configurable, such that the third party may be allowed to load a language identification model, an accent identification mode and/or an ASR model into the MDS 300 for use by the third-party. The loading of the user-supplied model may be performed, for example, via an authenticated REST API call, wherein the proprietor of the present systems and methods allows the third party to access the authenticated REST API in exchange for a form of compensation. In such cases, another device (e.g., a third party laptop) may access the MDS via a networked connection that may be the same network or a different network from the one used by the edge devices. In other cases, user-supplied models are loaded into the MDS 300 using one or more remote hyperlinks and optional sets of credentials, which hyperlinks are used to download the user-supplied models at run time. These example hyperlinks and/or credentials can be supplied to the MDS 300 via one or more environmental variables, infrastructure secrets (e.g., Kubernetes secrets), configuration files, or similar mechanisms.

Exemplary Meta Loop Logic Embodiment

A meta loop logic may include instructions for using multiple instances of the MDS 300 and/or processing multiple audio signals simultaneously with a single instance of the MDS 300, in some examples and scenarios. The multiple instances of the MDS may be executed in parallel and/or concurrently.

For example, it will be appreciated by those of ordinary skill in the art that some examples may include processing multi-speaker audio inputs. For example, in an airport, the edge device 100 may receive digital audio input corresponding to utterances of speakers of different languages and/or language-accents simultaneously or closely in time. Therefore, some examples of the present techniques may include denoising and/or speaker segmentation. Speaker segmentation may include segmenting the digital audio input into two or more respective digital audio inputs corresponding to the multiple speakers. The edge device 200 may include instructions for performing the speaker segmentation and for processing the respective digital audio inputs, for example, to identify a respective intent. Importantly, the speakers whose speech is segmented as described may, but need not, be speaking the same language or language-accent. Thus, the meta loop logic may include instructions for instantiating a pool of MDS threads/processes that are each capable of performing the MDS processing simultaneously, or near in time, to perform multi-speaker/multi-language processing. It should also be appreciated that the speech segmentation allows the respective plurality of MDS threads/processes to process the input without the need to specify or predetermine which languages/accents are spoken in the respective digital audio inputs.

Continuing the example, one or more of the respective digital audio inputs may correspond to a respective intent. In that case, the meta loop logic may perform additional actions and/or display information with respect to each intent. For example, multiple responses may be displayed, in a respective localized language corresponding to the identified language/accent of the respective digital audio inputs, in a columnar output on a display screen. While the present techniques may support multi-speaker, multi-language displays, the meta loop logic may include instructions for limiting the amount of information/number of speakers at any given time to avoid overloading information density. Such instructions may include thresholding instructions that limit the speaker segmentation by acoustic characteristics (e.g., according to speaker proximity/volume).

In still further examples, the meta loop logic may manage dialogue state, for example, to allow speakers to converse via an MDS, and/or to allow the MDS to respond to multiple people simultaneously. For example, continuing the airport kiosk example, a first user may utter, in a first language, "I could go for a cheeseburger." An edge device 200 corresponding to the kiosk may capture via its microphone(s) digital audio input corresponding to the utterance and transmit the utterance via the REST API to the MDS 300. The MDS 300 may perform language and/or accent identification, ASR and dialogue analysis. The MDS 300 may respond to the user by displaying an advertisement for a nearby McDonalds restaurant on the kiosk display. A second user, upon seeing the advertisement, may utter, in a different language, "I wonder where that McDonalds is?" The edge device 200 may process the utterance of the second user via the MDS 300, and display as a response a map to the McDonalds. It will be understood by those of ordinary skill in the art that many further uses are envisioned, and that the foregoing example is intentionally simplified for expository purposes.

In some examples, ASR text may be used for multiple intent classification steps, such as showing a map, listing restaurants, for performing sentiment analysis and/or reading comprehension to answer questions. Intents may be localized. For example when the speaker's language is identified to be Mandarin, intents may be localized and displayed by the edge device in Mandarin (e.g., as a localized image, video, text response, etc.). Some responses may be language-independent (e.g., a photo of a flower).

It will also be appreciated by those of ordinary skill in the art that in some examples, some analyses that are supported by the present techniques may not be used. For example, at a border crossing, the dialogue aspects of the present invention may not be used. Rather, a governmental body may use a suite of functionality that performs language identification and/or accent identification, and/or ASR to allow a human translator/advocate to be located who speaks the language of a traveler.

Exemplary Multilingual Dialogue Data Curation System

Figure 4:
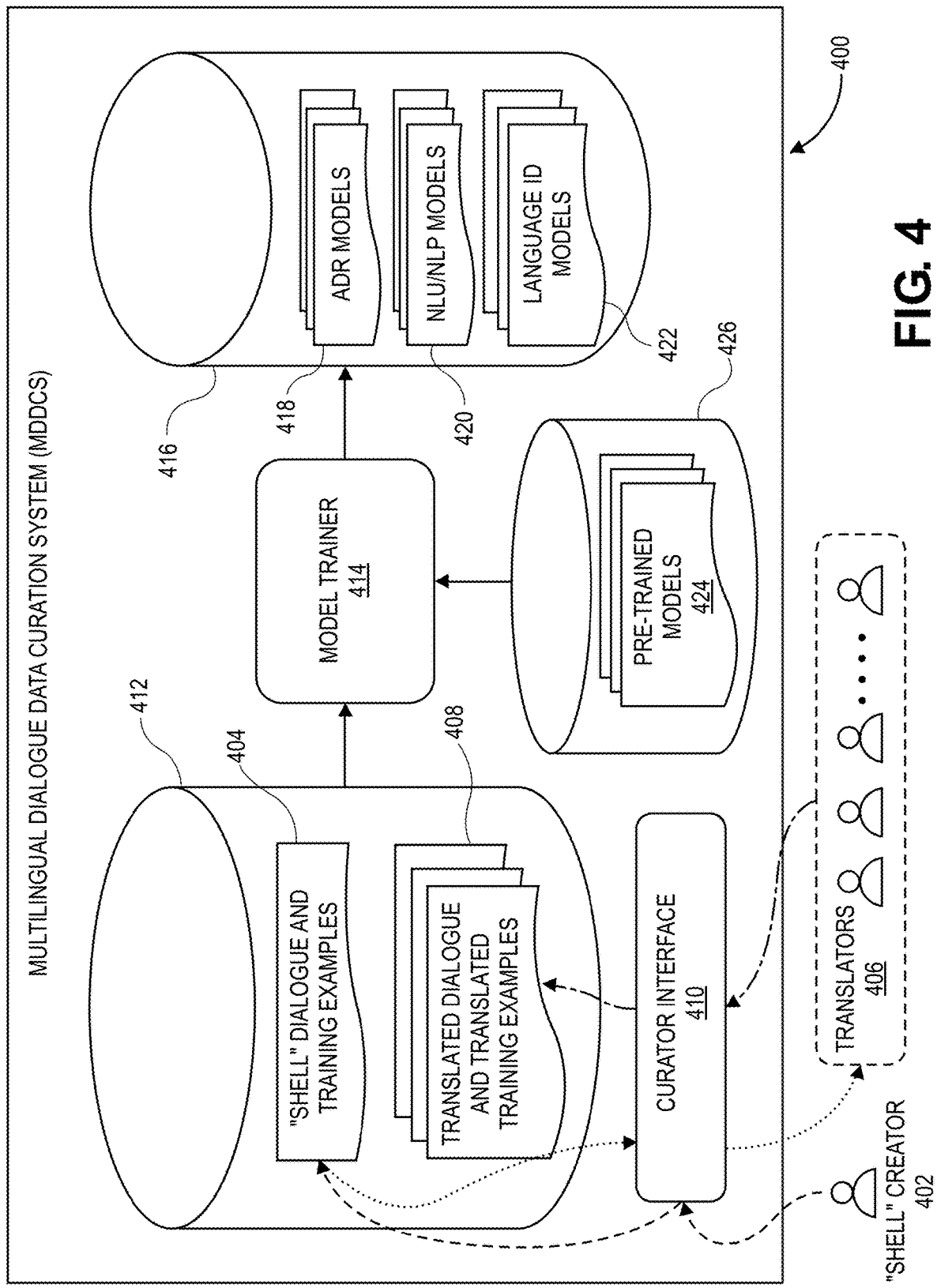
FIG. 4 depicts a multilingual dialogue data curation system, according to the present disclosure.

FIG. 4 shows an example Multilingual Dialogue Data Curation System (MDDCS) 400 that enables a shell creator 402 to create shell dialogue and training examples 404. These shell dialogue and training examples 404 include flat files or structured data that represent: (i) a flow of conversation and responses to particular intents and entities; (ii) training examples for the intents and entities referenced in the flow of conversation. Together the shell dialogue and training example 404 define a conversation or dialogue that is to be supported by a dialogue system, such as a chatbot, smart speaker, contactless kiosk, smartphone assistant, or similar dialogue system. The shell dialogue and training examples 404 are in a first language known to the shell creator 402. These shell dialogue and training examples 404 are accessed using the MDDCS 400 by translators 406 such that they can translate the shell dialogue and training examples 404 into one or more other languages resulting in translated dialogue and training examples 408. These translated dialogue and training examples 408 serve to localize the conversation or dialogue represented in the shell dialogue and training examples 404 and support a dialogue system interacting with users in multiple languages (e.g., English, Arabic, Mandarin, etc.).

In some scenarios, the shell dialogue and training examples 404 and the translated dialogue and training examples 408 are text and/or audio representations of anticipated conversations or user interactions along with corresponding intents, entities, sentiment, or variables corresponding to those conversations or user interactions. In these scenarios, the MDDCS 400 may be configured to utilize the shell dialogue and training examples 404 and the translated dialogue and training examples 408 to create assets (e.g., models) for a dialogue system, such as a chatbot, that interacts with users primarily via text. In other scenarios, the shell dialogue and training examples 404 and the translated dialogue and training examples 408 may include audio data, and the MDDCS 400 may be configured to create assets for a dialogue system, such as a smart speaker, that interacts with users primarily via speech. In still other scenarios, the shell dialogue and training examples 404 and the translated dialogue and training examples 408 may include multiple types of data (e.g., text, audio, imagery, video, etc.), and the MDDCS 400 may be configured to create assets for a dialogue system that interacts with users via multiple modes of interaction including text, speech, imagery, hyperlinks, GIFs, and/or other types of interactions.

The shell creator 402 and the translators 406 interact with the MDDCS 400 through a curation interface 410. The curation interface 410 is one or more software programs that are connected to a data store 412 via a network, such as the Internet, an API, or a database connection. The shell creator 402 and the translators 406 interact with the curation interface via a network, such as the Internet, and personal computing devices, such as laptop computers, desktop computers, tablet computers, or smartphones running Internet browsers or applications configured to connect to the curation interface 410. The devices operated by the shell creator 402 and the translators 406 send data to the curation interface 410 representing the shell dialogue and training examples 404 and the translated dialogue and training examples 408, and the curation interface 410 stores this data, or a modified version of the data, in the data store 412 as the shell dialogue and training examples 404 and the translated dialogue and training examples 408.

A model trainer 414 of the MDDCS 400 utilizes the shell dialogue and training examples 404 and the translated dialogue and training examples 408 to train or fit a variety of models to be utilized in a multilingual dialogue system, such as a chatbot, smart speaker, smartphone assistant, etc. In some implementations, the training of these models by the model trainer 414 involves pre-processing the shell dialogue and training examples 404 and the translated dialogue and training examples 408 into one or more training data sets, executes a training process to train or fit one or more AI or machine learning models based on the one or more training data sets, and serializes the one or more AI or machine learning models to one or more files stored in a model data store 416. The models trained by the example model trainer 414 include ASR models 418, spoken language identification models 420, text language identification models 422, and Natural Language Understanding/Natural Language Processing (NLU/NLP) models 424. Although, in certain other scenarios, the model trainer 414 may be configured to produce only some of the ASR models 418, the spoken language identification models 420, the text language identification models 422, and the Natural Language Understanding/Natural Language Processing (NLU/NLP) models 424 and not others.

The example training or fitting performed by the model trainer 414 to train or fit the ASR models 418, the spoken language identification models 420, the text language identification models 422, and the NLU/NLP models 424 involves iterating over training examples in the shell dialogue and training examples 404 and the translated dialogue and training examples 408 while optimizing parameters of the ASR models 418, the spoken language identification models 420, the text language identification models 422, and the NLU/NLP models 424. In many scenarios, the iterative process employed by the model trainer 414 is a known optimization scheme, such as gradient descent, batch gradient descent, mini-batch gradient descent, novgorod, adam optimization, or similar. Respective optimization techniques and/or training/fitting processes that may, but need not, differ, may be used for training different respective models. For example, the ASR models 418 may be trained using a first respective modeling approach. The language identification models 422 may be trained using a second respective modeling approach. The incident identification model may be trained using yet a third respective modeling approach The training data sets used by the model trainer 414 may be monolingual training data sets each including data in one language from the data store 412. Alternatively or additionally, the training data set used by the model trainer 414 may be multilingual training data sets each including data in multiple languages from the data store 412. Thus, the ASR models 418, the spoken language identification models 420, the text language identification models 422, and the NLU/NLP models 424 may include only monolingual models, a mix of monolingual and multilingual models, or all multilingual models.

In some implementations, the model trainer 414 uses pre-trained models 424 from a pre-trained model data store 426 during the training process to create the ASR models 418, the spoken language identification models 420, the text language identification models 422, and the NLU/NLP models 424. The model trainer 414 may use fine-tuning or transfer learning to adapt general purpose or related models in the pre-trained models 424 into the ASR models 418, the spoken language identification models 420, the text language identification models 422, and the NLU/NLP models 424. For example, the model trainer 414 may fine-tune pre-trained transformer models from the pre-trained models 424 by adding and fitting a text classification, sentiment analysis, or named entity recognition head on the pre-trained transformer models. In other examples, the model trainer 414 may fine-tune pre-trained ASR models for a particular language to create ASR models for accents of that language.

In review, training may be performed in multiple locations throughout the present techniques. Many (e.g., thousands or more) audio samples/language samples and accent samples may be used to perform speech-based analysis.

The language identification models 310 may perform offline training of one or more models to perform language identification. There, the MDS 300 may prepare/annotate data and audio using separate ISO-based language classes (e.g., ENG for English, TAM for Tamil, etc.). The MDS 300 may convert audio files to Mel spectrogram, and analyze the Mel spectrograms using a ML model (e.g., a neural net) to classify them. Many (e.g., thousands or more) audio samples/language samples and accent samples may be used to perform speech-based analysis.

In some examples, the MDS 300 may enable accent identification by offline training of one or more models to perform accent identification. There, the MDS 300 may prepare/annotate data and audio using ISO-based (or other) accent classes. The MDS 300 may convert audio files to Mel spectrogram, and analyze the Mel spectrograms using a ML model (e.g., a neural net) to classify them. The MDS 300 may compensate by weighting some classes to account for biases represented in training data. As noted, existing language identification and accent identification models are strongly biased in favor of majority languages. In a monolithic model, defined herein as one or models that attempt to account for multiple accents and/or languages, it is easy for a handful of languages to dominate.

A monolithic model may include one or models that perform separate functions (i.e., an ensemble of models) such as lexical models, acoustic models, language models, etc. in a "one-size-fits-all" approach to analyzing language and accent. The present techniques differ from conventional monolithic modeling by analyzing input digital audio using different model flows for different languages, wherein the model flow is driven by the selection (e.g., by the MDS 300) of a subset of one or more models based on a language identification, accent identification or other criteria, as described herein. A model flow in the present techniques may include a single end-to-end model or a plurality of models (i.e., an model ensemble) that analyze digital audio to perform a function (e.g., inference). Each model in the model flow may be fine-tuned specifically for a particular language and/or accent, and thus the disadvantages inherent to conventional modeling are advantageously avoided.

However, the dynamic configurability of the present techniques advantageously works to limit, and in some cases, eliminate bias by avoiding a one-size-fits-all model that works for everything, and instead using many (e.g., three or more) models that can be independently trained, tested and evaluated and loaded on-demand. Of course, it will be appreciated by those of ordinary skill in the art that in some examples, the present techniques may use fewer than three models, such as a deployment having only a single model. Overall, models fine-tuned for accents perform better and are less biased than conventional monolithic models. For example, an English model that includes support for multiple accents generally performs worse than a model trained specifically for Chinese-accented English.

Training may also be performed to enable automatic speech recognition. As noted, the present techniques represent an advancement over conventional techniques. Conventionally, a speech recognition includes three or more parts (e.g., a lexicon model, an acoustic model, a language model, etc.) that are used end to end in a single model to convert audio to text. In the present techniques, an ASR model may be used that uses compressed convolutional layers to create a more space/parameter compact version. For example, the model of the present techniques may have fewer (e.g., $\frac{1}{30}^{th}$) the number of parameters of conventional speech models. Therefore, the MDS of the present techniques is able to load the models much faster, saving space on edge devices and allowing more models to be used. Because the models are smaller, they can be dynamically loaded faster and more easily. In some scenarios, such as an airport, a network connection may not be available, or may be available only for low-traffic applications. Further, the models can be run on edge devices that will not accommodate monolithic models geared for cloud computing.

Training may also be performed using text-based training data to enable dialogue/NLU and/or NLP facilities, as discussed with respect to FIG. 4.

Exemplary Multilingual Dialogue Methods

Figure 5:
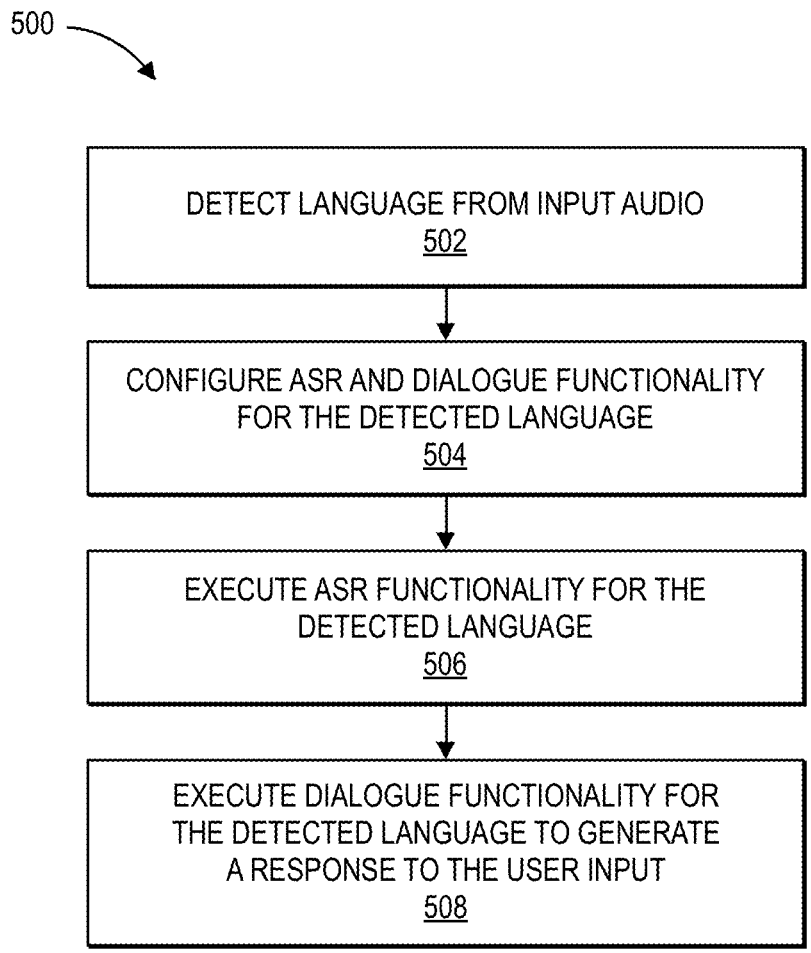
FIG. 5 depicts an exemplary computer-implemented method for enabling contactless, multilingual dialogue interactions with a user, according to the present disclosure.

FIG. 5 shows a block diagram of an exemplary method 500 for enabling contactless, multilingual dialogue interactions with a user. The exemplary method 500 may be performed by combinations of hardware, software, firmware, etc., for example, by components of the exemplary edge device 100, the exemplary system 200, or the exemplary multilingual dialogue server (MDS) 300.

The method 500 may include detecting a language (e.g., English, Mandarin, Arabic, etc.) by analyzing digital audio input (block 502). The method 500 may include inputting the digital audio input into a trained spoken language identification model. The spoken language identification model may accept as input one or both of 1) the raw input audio and 2) a pre-processed version of the raw input audio (e.g., a Mel spectrogram). The spoken language identification model may analyze the input and, in response, output an indication of a language corresponding to the digital audio input. The spoken language identification model may be an AI and/or ML model trained by iterating over a training data set of example audio or pre-processed audio files corresponding to multiple languages, as described above. In this way, the parameters of the spoken language identification model are trained or fit allowing the spoken language identification model to discriminate between languages for input audio to generate the indication of the language corresponding to the digital audio input (e.g., English).

The method 500 may include configuring an ASR and dialogue functionality based on the language detected at block 502 by one or both of: (i) setting one or more function arguments, elements of metadata, or variables indicating the language corresponding to the input audio; and (ii) loading or causing the combinations of hardware, software, or firmware to load a subset of ASR and dialogue-related models stored in a data store into memory (block 504). In this way, the ASR and dialogue functionality are, advantageously, specifically configured and optimized for operating on input audio corresponding to the detected language. In particular, the ability of the ASR and dialogue functionality to be optimized in this way represents an advantage over conventional modeling approaches that use monolithic modeling and runtime behaviors that require outsized compute resources for training, retraining and operation.

The method 500 may include executing the ASR functionality configured at block 504 to convert the input audio into text (block 506). The method 500 may include utilizing one or more specific ASR models corresponding to the language detected at block 502 to convert the input audio to text. In some examples, the ASR functionality may include a single "end-to-end" model trained on samples of audio corresponding to the language detected at block 502. In some examples, the ASR functionality may include multiple models, such as a lexicon, acoustic model, and language model, trained on samples of audio corresponding to the language detected at block 502. The output text from the ASR functionality may be represented by a writing system script (e.g., Latin, Cyrillic, Arabic, etc.) appropriate for representing the language detected at block 502 and able to be processed in later blocks for generating a response to the input audio.

The method 500 may include executing the dialogue functionality configured at block 504 to convert the text generated at block 506 into a response to the digital audio input (block 508). The method 500 may include utilizing one or more NLU/NLP models corresponding to the language detected at block 502 to generate a response to the input audio. In generating the response, the one or more specific NLU/NLP models may generate intermediate results corresponding to the text generated at block 506, such as user intents, entities, and sentiment. The dialogue functionality may also load and utilize conversation templates, representations of conversation flow, candidate responses, and/or rules for conversation flow in generating the response to the input audio. The response to the input audio may include text, audio, imagery, video, or GIF elements, in some examples.

Figure 6:
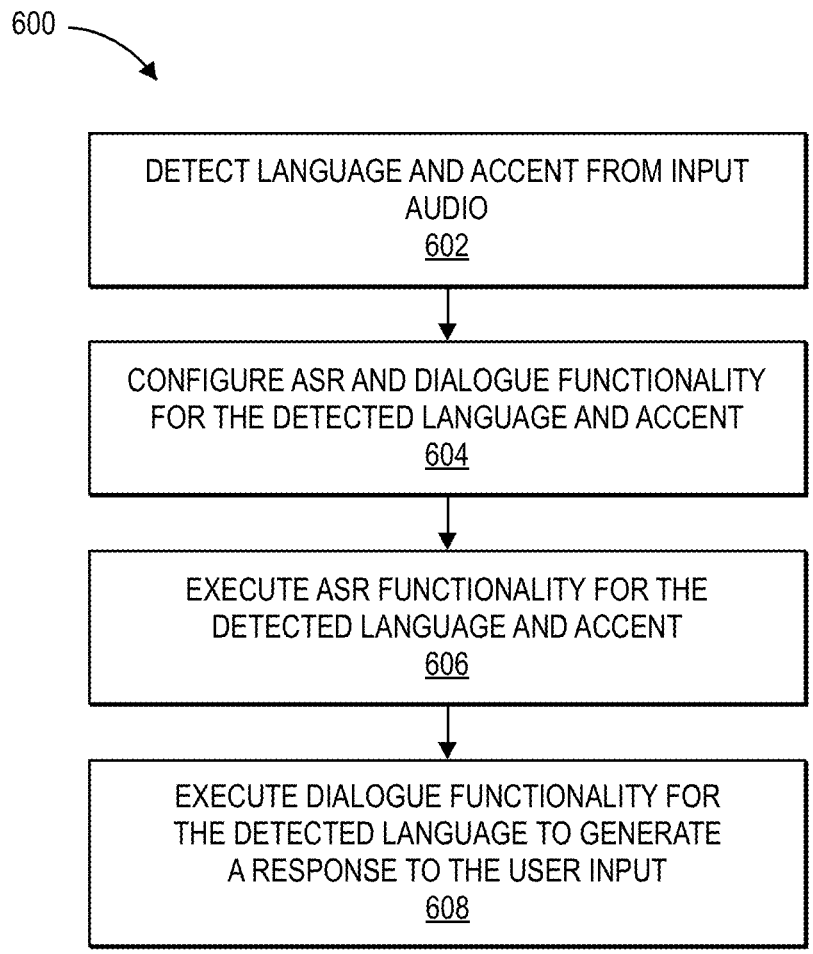
FIG. 6 depicts an exemplary computer-implemented method for enabling contactless, multilingual dialogue interactions with a user, according to the present disclosure.

FIG. 6 shows a block diagram of an exemplary method 600 for enabling contactless, multilingual dialogue interactions with a user. The exemplary method 600 may be performed by combinations of hardware, software, firmware, etc., for example, by components of the exemplary edge device 100, the exemplary system 200, or the exemplary multilingual dialogue server (MDS) 300.

The method 600 may include detecting a language (e.g., English, Mandarin, Arabic, etc.) and accent of language (e.g., Chinese accented English, Taiwanese accented Chinese, etc.) based on input audio (block 602). The method 600 may include inputting digital audio input into a spoken language and accent identification model that accepts as input one or both of 1) the raw input audio and 2) a pre-processed version of the raw input audio (e.g., a Mel spectrogram). The spoken language and accent identification model may output an indication of a language and accent corresponding to the input audio. The spoken language identification model may include one or more AI model, one or more ML model, and/or an ensemble of AI/ML models trained by iterating over a data set of example audio or pre-processed audio files corresponding to multiple languages and accents. In this way, the parameters of the spoken language and accent identification model are trained or fit allowing the spoken language and accent identification model to discriminate between languages and accents for input audio.

The method 600 may include configuring ASR and dialogue functionality based on the language and accent detected at block 602 (block 604). Configuring the ASR and dialogue functionality may include one or both of: (i) setting one or more function arguments, elements of metadata, or variables indicating the language and accent corresponding to the input audio; and (ii) loading or causing the combinations of hardware, software, firmware, etc. to load a subset of ASR and dialogue-related models stored in a data store into memory. In this way, the ASR and dialogue functionality are, advantageously, specifically configured and optimized for operating on input audio corresponding to the detected language and accent. The ability of the ASR and dialogue functionality to be optimized represents an advantage over conventional modeling approaches that use monolithic modeling and runtime behaviors that require outsized compute resources for training, retraining and operation.

The method 600 may include executing the ASR functionality configured at block 604 to convert the input audio into text. The method 600 may include utilizing one or more specific ASR models corresponding to the language and accent detected at block 602 to convert the input audio to text. The ASR functionality may include a single "end-to-end" model trained on samples of audio corresponding to the language and accent detected at block 602. In some examples, the ASR functionality may include multiple models, such as a lexicon, acoustic model, and language model, trained on samples of audio corresponding to the language and accent detected at block 602. The output text from the ASR functionality may be represented by a writing system script (e.g., Latin, Cyrillic, Arabic, etc.) appropriate for representing the language detected at block 602 and able to be processed in later blocks for generating a response to the input audio.

The method 600 may include executing the dialogue functionality configured at block 604 to convert the text generated at block 606 into a response to the input audio (block 608). The method may include using one or more specific NLU/NLP models corresponding to the language and accent detected at block 602 to generate a response to the input audio. In generating the response, the one or more specific NLU/NLP models may generate intermediate results corresponding to the text generated at block 606, such as user intents, entities, and sentiment. The dialogue functionality may also load and utilize conversation templates, representations of conversation flow, candidate responses, and/or rules for conversation flow in generating the response to the input audio. The response to the input audio may include text, audio, imagery, video, or GIF elements.

Exemplary Incident Detection Examples

Figure 7A:
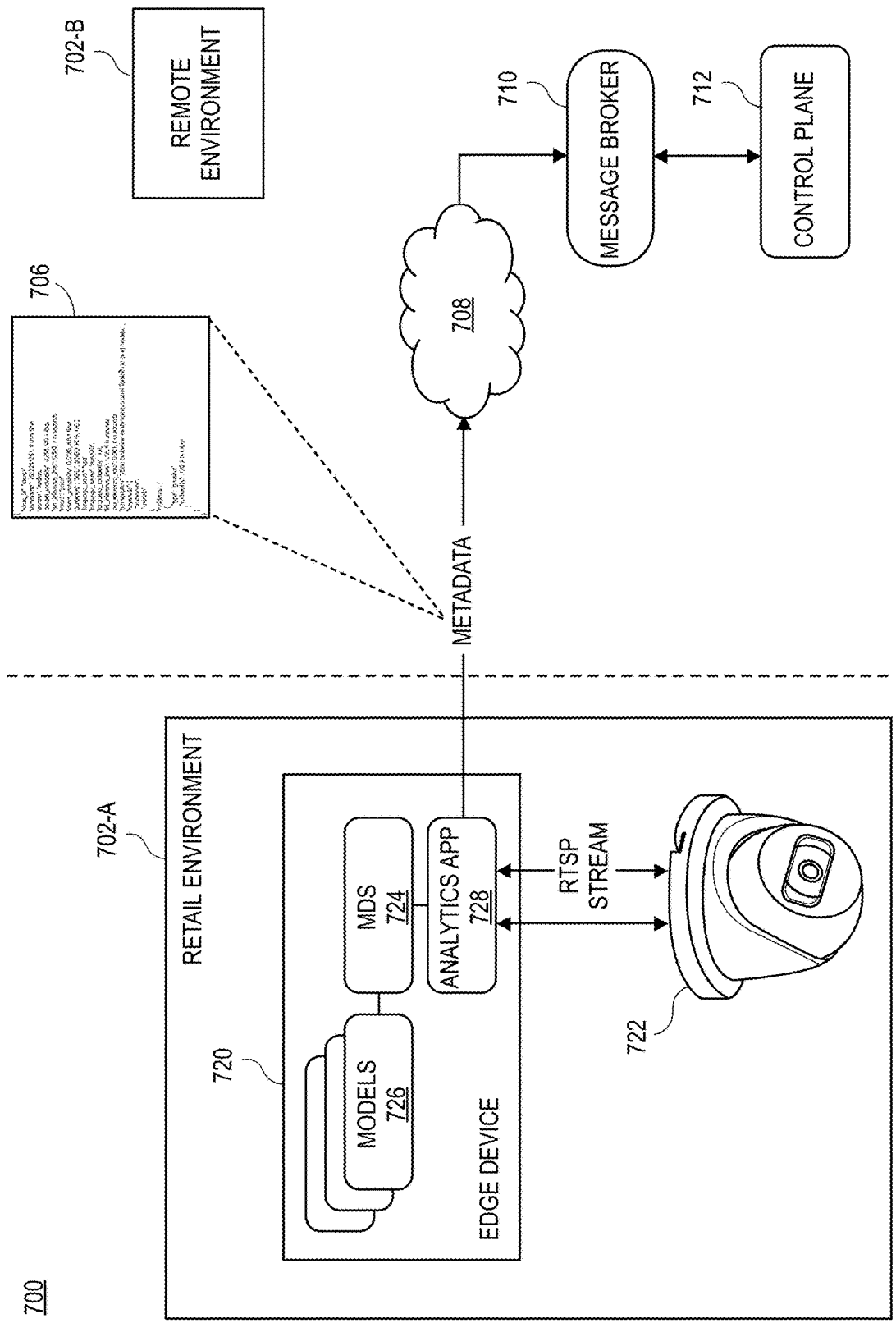
FIG. 7A depicts an exemplary incident detection and reporting computing environment, according to the present disclosure.

FIG. 7A depicts an exemplary incident detection and reporting computing environment 700, according to one embodiment and scenario. The environment 700 includes a retail sub-environment 702-A and a remote environment 702-B. The sub-environment 702-A may include an edge device 704. As discussed above with respect to FIG. 2, the edge device 704 may transmit sets of metadata 706 via a network 708 to a message broker 710. The sets of metadata are described in detail with respect to FIG. 7B, below. The sets of metadata 706 received by the message broker may be accessed by a control plane application 712. The retail environment 702-A may correspond to any location in which business is conducted, such as a bar, a restaurant, a shop, a store or a sub-location thereof (e.g., a cashier's station within a larger store). Of course, a store or other business location may include a plurality of retail environments 702-A. The retail environment 702-A may include an edge device 720 and a capture device 722.

The edge device 720 may include a memory (e.g., one or more transitory and/or non-transitory memories, such as hard disks, random-access memory, etc.). The edge device 720 may include one or more processors (e.g., one or more central processing units (CPUs), one or more graphics processing units (GPUs), etc.). In general, the edge device 720 may correspond to edge device 100, edge device 200, etc. The edge device 720 may include a module that includes instructions for streaming data from the capture device 722.

The capture device 722 may comprise one or more microphones and/or one or more cameras. For example, the capture device 722 may be a device that captures audio and/or video in response to movement, sound or other sensed environmental stimuli. The capture device 722 may include onboard memory for storing captured sound and/or video data. The capture device 722 may include instructions for serving captured sound and/or video data in real-time, or from a buffer after a period of delay. For example, the capture device 722 may serve data via an RTSP server, or via another suitable streaming technology or technique.

The edge device 720 may include a plurality of modules and trained models. For example, FIG. 7A depicts an MDS module 724 that may correspond to the MDS 102, the MDS 210, the MDS 300 (depicted below), etc. The MDS 724 may electronically access one or more models 726. In some cases, the models 726 may correspond to the models 310 and/or the models trained by the model trainer 414. For example, the models 726 may include one or more ASR models, one or more spoken language identification models, one or more text language identification models, and one or more Natural Language Understanding and/or Natural Language Processing (NLU/NLP) models stored, respectively, in suitable file formats, such as pickle, protobuf, Caffe model, MXNet model, ONNX, XML, text, JSON, or other file formats used to serialize AI, ML and/or statistical models.

The models 726 may include one or more models trained to perform respective functions, such as an incident detection model trained to analyze digital audio input input to identify one or more incidents included in digital audio input, a sentiment analysis model trained to analyze digital audio input to determine speech sentiment indications, a language detection model trained to analyze digital audio input to determine one or more languages and/or accents corresponding to the digital audio input, a ASR model trained to analyze digital audio input to detect speech included in the digital audio input, an entity detection model trained to analyze digital audio input to identify one or more entities included in the digital audio input, etc. The MDS module 724 and models 726 may be accessed and managed by a streaming retail analytics application 728.

The streaming retail analytics application 728 may include executable computing instructions configured to be executed by one or more processors of the edge device 720 to perform functions independent of the MDS 724 and the models 726 and/or in concert with them. For example, the streaming retail analytics application 728 may receive streaming digital input from the capture device 722. The streaming digital input may include one or both of (i) digital audio input, and (ii) digital video input. The streaming retail analytics application 728 may include instructions for storing the streaming digital input in the one or more memories of the edge device 720, and/or for passing the streaming digital input via an in-memory proxy with no storage.

The streaming retail analytics application 728 may include instructions for accessing one or more of the models 726 via the MDS 724, for receiving output from the accessed model(s) and/or for processing the model output. For example, the streaming retail analytics application 728 may pass a portion of the streaming digital input from the capture device 722 to an incident detection model trained to analyze digital audio input input to identify one or more incidents included in the digital audio input. The portion of the streaming digital input may be, for example, a sub-part of the digital audio input, such as a byte stream, a byte array, a serialized file, etc. The portion of the streaming digital input may be stored on disk or in memory. The portion of the streaming digital input may be referenced by one or more pointers.

The model may analyze the streaming digital input and output a list of incidents contained in the portion of the streaming digital input. For example, the list of incidents may be chronological, and each may include a timestamp and/or other metadata, as discussed below. The streaming retail analytics application 728 may pass portions of the streaming digital input to other/additional models 726, and collect respective outputs from those models. The streaming retail analytics application 728 may also (or alternatively) store the streaming digital in persistent storage as WAV, MP3, MP4, or similar files. For example, an application other than the streaming retail analytics application 728 may read the stored digital files as the files are written out to the storage.

The streaming retail analytics application may dynamically load models at runtime for processing digital input data. As discussed above, this on-the-fly/dynamic/runtime configurability of the data processing of input may advantageously allow the MDS to only load some of the trained models of the MDS into the memory of the edge device 720, thereby advantageously improving the memory usage of the edge device 720. In some deployments of the present techniques, only some of the models are used for inferential purposes during the processing of each portion or file. Limiting the usage of the models in this way advantageously prevents latency issues attendant to using all models simultaneously.

The streaming retail analytics application 728 may include instructions for activating the models serially or in parallel. The streaming retail analytics application 728 may include instructions for accessing a second model based on the output of a first model. For example, the streaming retail analytics application 728 may pass the portion of the streaming digital input to a sentiment analysis model. The streaming retail analytics application 728 may analyze the output of the sentiment analysis model, and when the output is not favorable, the streaming retail analytics application 728 may pass the portion of the streaming digital input to a speech recognition model. In this way, the present techniques advantageously enable sophisticated processing to occur in the client device, enabling user sentiment and exact speech patterns to be captured and reacted to immediately.

Those of ordinary skill in the art will appreciate that the streaming retail analytics application 728 is not limited to using sentiment analysis modeling techniques. In some examples, the streaming retail analytics application 728 may activate additional, or alternative, models. For example, the streaming retail analytics application 728 may use one or more models to perform question answering, intent detection, coreference, entity detection, keyword spotting, etc.

In some examples, the streaming retail analytics application 728 may generate, by analyzing the one or more stored incidents, a set of metadata; and transmit, via the electronic network, the set of metadata to a remote computing device. The generation may include collating the output of multiple models into a hierarchical, machine-readable data structure (e.g., an XML data structure, a JSON data structure, etc.). For example, the streaming retail analytics application 728 may analyze one or more incidents output by an incident detection model. The streaming retail analytics application 728 may transmit metadata indicative of a particular incident (e.g., a broken glass incident) to the message broker 710, in addition to other information about the edge device 720, the retail environment 702-A, etc. The message broker 710 may be implemented as a message queue, a message broker, a PubSub network protocol, an MQTT protocol, etc. Another service, such as a control plane application 712 may retrieve the metadata, asynchronously, from the message broker 710.

Thus, one distinct advantage and improvement of the present techniques over conventional techniques is that the present techniques are capable of buffering incident data and, importantly, other data such as recognized speech, detection languages, detected accents detected sentiment, detected intents, detected entities, etc. This caching is important in edge device deployments, because such deployments often are part of a larger system but lack stable network connectivity. Conventionally, data may be lost if the edge device is unable to immediately transmit. A further improvement over conventional incident detection systems is that the incidents may be sent to the secure remote environment 702-B as soon as practical, meaning that a bad actor cannot modify, remove or otherwise tamper with the incident information, even if the bad actor compromises aspects of the retail environment 702-A such as the edge device 720.

FIG. 7B depicts an exemplary incident detection metadata diagram 740, according to an embodiment. The incident detection metadata diagram 740 corresponds to the set of metadata 706 of FIG. 7A. The incident detection metadata diagram 740 depicts a JSON representation of metadata related to an incident at an environment (e.g., the retail environment 702-A). The incident detection metadata diagram 740 includes a first section 742, that includes key-value pairs describing the store identifier of the retail environment 702-A, a timestamp at which the incident was detected, a language accent of a speaker contemporaneous with the detected incident, a probability or certainty value corresponding to that detected accent, an ASR inference time measure, a detected intent and corresponding probability value, a detected sentiment (e.g., neutral), a detected language and corresponding probability, a transcription of detected speech, a list of detected keywords 746, and a dictionary of detected incidents 748, wherein each detected incident includes a type (e.g., gunshot) and corresponding probability value.

It will be appreciated by those of ordinary skill in the art that the incident detection metadata diagram 740 represents collated output of multiple models (e.g., a plurality of the models 726 of the edge device 720 of FIG. 7A). For example, the accent and language key/value pair may be output by a language detection model; the sentiment key/value pair may be output by a sentiment detection model; the transcription key/value pair may be output by a transcription model; the keywords key/value pair may be output by an entity model; the incidents may be output by an entity detection model; and so forth. The present techniques improve incident detection computing systems by bringing together a data-rich view of points in time at which incidents are detected, providing downstream services with powerful insight and the ability to react. For example, when the probability of a gunshot exceeds 80%, it is likely that a third-party security company monitoring the incident detection metadata diagram 740 will want to take immediate action. The presence of negative sentiment, and other metadata key/value information may provide additional impetus to act. Even pinpointing the time of day, such as after business hours, may provide logical clues that are useful for reacting to incident detection events propagated by the present techniques.

Incidents may include a glass break incident; a raised voice incident; a loud sound incident; an exclamation incident (e.g., a yell or a scream); a gunshot incident; an explosive incident; or any other incident of interest. It will be appreciated by those of ordinary skill in the art that the incidents need not be violent or shocking in nature. Rather, in some examples, an incident may be defined as a cough, a particular phrase or a neutral sound such as a door latching or unlatching. In general, the present techniques train the incident detection model(s) using historical information, such as a labeled data set of sounds. For example, the training may include supervised learning techniques wherein an artificial neural network is trained using a data set comprising a plurality of sample noises indicating incident types, such as gunshot digital audio files, dogs barking, vehicle accidents, etc.

Exemplary Incident Detection and Reporting Methods

Figure 7C:
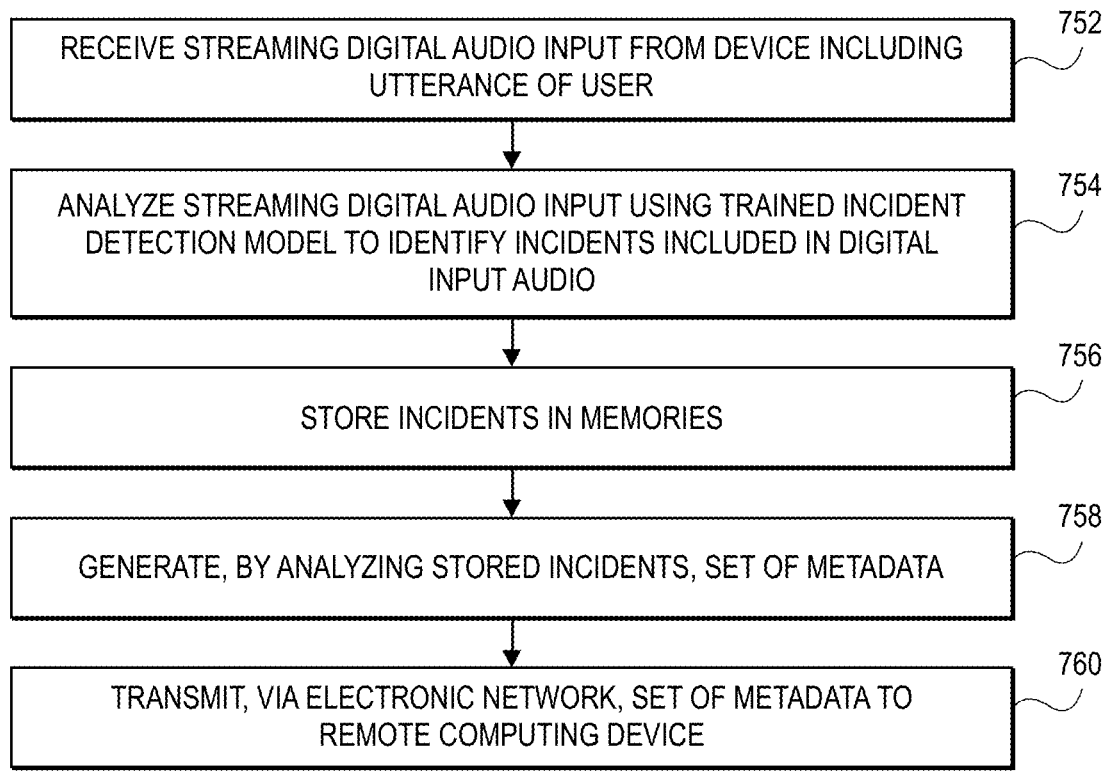
FIG. 7C depicts an exemplary computer-implemented method for incident detection and reporting, according to the present disclosure.

FIG. 7C depicts an exemplary computer-implemented method 750 for incident detection and reporting, according to an embodiment. The method 750 may include receiving streaming digital audio input from at least one device including at least one utterance of a user (block 752). For example, the streaming digital audio input may correspond to a video tape of a customer checking out at a cashier of a retail store. The customer's statements/conversation with a store employee while checking out may be the subject of the digital audio input.

The method 750 may include analyzing the streaming digital audio input using the trained incident detection model to identify one or more incidents included in the digital audio input (block 754). The method 750 may include storing the one or more incidents in the one or more memories (block 756). The incidents may be analyzed to determine a respective severity of the incidents. In some cases, the method 750 may include performing an action (e.g., sending an alert email) if an incident meets a predetermined criterion. The method 750 may include generating, by analyzing the one or more stored incidents, a set of metadata (block 758). As depicted above, the metadata may include output of one or more models 726. The method 750 may include transmitting, via the electronic network, the set of metadata to a remote computing device (block 760).

In some examples, the method 750 may include analyzing the streaming digital audio input using the trained sentiment analysis model to determine one or more speech sentiment indications; analyzing the streaming digital audio input using the trained language detection model to determine one or more languages corresponding to the digital audio input; analyzing the streaming digital audio input using the trained speech recognition model to detect speech included in the digital audio input; and/or analyzing the streaming digital audio input using the trained entity detection model to identify one or more entities included in the digital audio input. An incident model may be trained to detect a glass break incident; a raised voice incident; a loud sound incident; a gunshot incident, etc.

The method 750 may receive the streaming digital audio input via an RTSP link from a camera device. The camera device may include a microphone and/or a camera. The microphone and/or camera may be integral to the edge device 720, in some examples. The method 750 may further include transmitting the set of metadata to a message queue in the remote computing device. The method 750 may transmit the metadata periodically, such as every hour, or whenever an internet connection becomes available, and/or immediately (e.g., as soon as the stream is received and processed by the models 726). The method 750 may generate the metadata in a JavaScript Object Notation (JSON) format, or in another format suitable for storage in a message broker.

Exemplary AI and Machine Learning Language Functionality Methods

Figure 8:
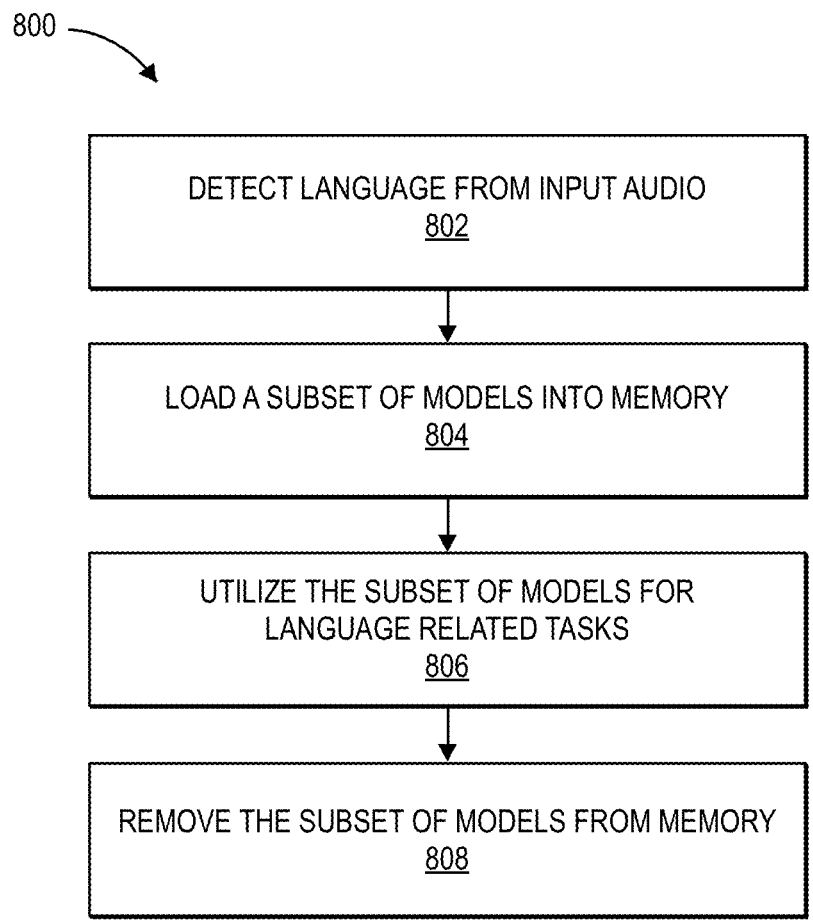
FIG. 8 depicts an exemplary computer-implemented method for optimizing artificial intelligence-driven language functionality on a device, according to the present disclosure.

FIG. 8 shows a block diagram of an exemplary method 800 for optimizing AI-driven language functionality on a device. The exemplary method 800 may be performed by combinations of hardware, software, firmware, etc., for example, by components of the exemplary edge device 100, the exemplary system 200, or the exemplary multilingual dialogue server (MDS) 300.

The method 800 may include detecting a language (English, Mandarin, Arabic, etc.) based on input audio (block 802). The method 800 may include inputting digital audio input into a spoken language identification model that accepts one or both of 1) the raw input audio and 2) a pre-processed version of the raw input audio (e.g., a Mel spectrogram) as input. The spoken language identification model may output an indication of a language corresponding to the input audio. The spoken language identification model may be an AI and/or ML model trained by iterating over a data set of example audio or pre-processed audio files corresponding to multiple languages. In this way, the parameters of the spoken language identification model are trained or fit allowing the spoken language identification model to discriminate between languages for input audio.

The method 800 may include loading a subset of models into a device's memory such that the device can execute language related functionality using the subset of models (block 804). For example, the device may be the edge device 100 of FIG. 1 or the edge device 200 of FIG. 2. The subset of models may include any models that allow for the execution of language specific functionality, such as ASR, NER, text classification, text summarization, reading comprehension, coreference, sentiment analysis, or speaker segmentation models. The particular subset of models are loaded from a data store storing both the subset of models and other models corresponding to other languages.

The method 800 may include the device utilizing the subset of models loaded into a device's memory at block 804 to perform corresponding language functionality (block 806). Because only a subset of models is loaded into memory, the memory of the device is advantageously optimized while still providing language related functionality for the language detected at block 802, representing an improvement over conventional monolithic system architectures and runtime behavior. In addition, the device is able to execute models known to correspond to the language detected at block 802 rather than having to execute all available models and discriminate good results from bad results, representing a further improvement over conventional designs. This type of model execution improves the execution time and reduces latency in responding to input audio over conventional techniques.

The method 800 may include removing the subset of models loaded at block 804 from the device's memory (block 808). This removal serves to advantageously reduce memory usage over time and free up device resources for other applications, representing yet another improvement over conventional techniques that load a monolithic model that is not separated (or separable) into multiple subsets of models.

Figure 9:
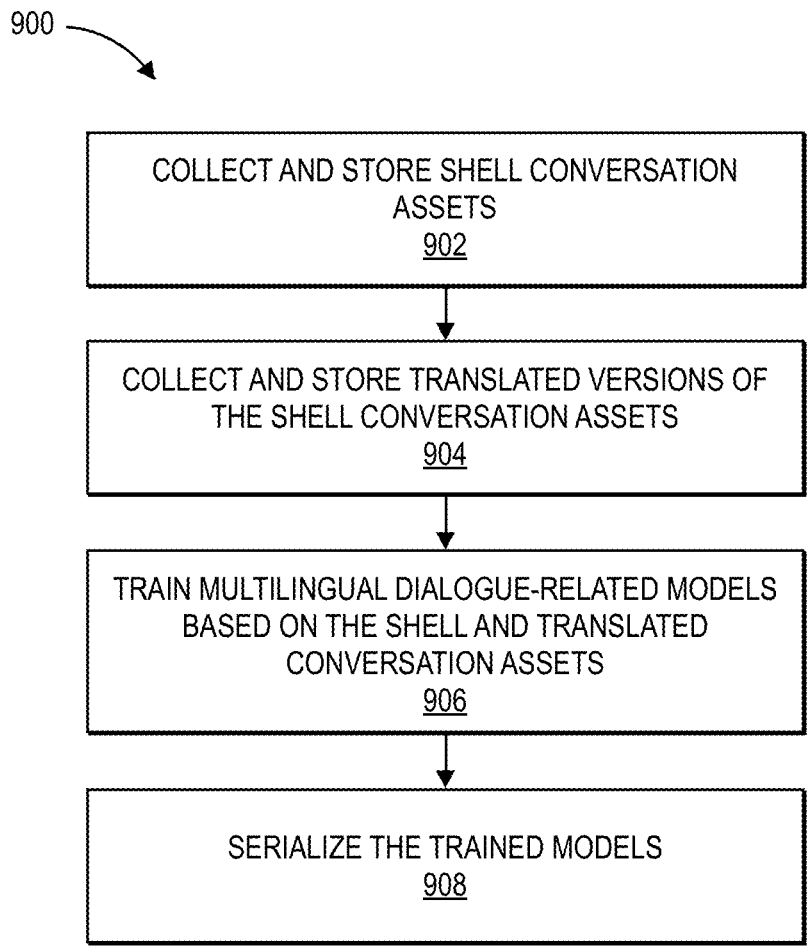
FIG. 9 depicts an exemplary computer-implemented method for training dialogue-related models based on curated multilingual data, according to the present disclosure.

FIG. 9 shows a block diagram of an exemplary method 900 for training dialogue-related models based on curated multilingual data. The exemplary method 900 may be performed by combinations of hardware, software, firmware, etc., for example, by components of the exemplary Multilingual Dialogue Data Curation System (MDDCS) 400. The training data is depicted in FIG. 13.

The method 900 may include collecting and storing shell conversational assets (block 902). These shell conversational assets may be text and/or audio representations of anticipated conversations or user interactions along with corresponding intents, entities, sentiment, or variables corresponding to those conversations or user interactions. In addition these conversational assets include multiple training examples for the various elements of the represented conversation. Depending on the exact nature of the conversational element, these training examples may include example statements of intent, example entities or entity synonyms, examples statements of various commands, and example statements of various sentiment values. The shell conversational assets are monolingual, but could be in any language.

The method 900 may include collecting and storing translated versions of the shell conversational assets. These translated conversational elements may correspond to some or all of the shell conversational assets. The translated versions of the conversational assets may be in one or more languages different from the language of the shell conversational assets (block 904). The collection and storing of the conversational assets may be performed by, for example, the curator interface 410 of FIG. 4.

The method 900 may include training dialogue-related models based on the shell conversational assets collected and stored in block 902 and the translated conversational asset collected and stored in block 904 (block 906). These dialogue-related models enable the functionality represented in the shell and translated conversational assets, such as intent recognition, named entity recognition, and sentiment analysis. The dialogue-related models also enable the functionality for multiple languages corresponding to the multiple languages into which the conversational elements have been translated. The creation of these models enabling multilingual dialogue can be, thus, automatically generated from the shell and translated conversational assets reducing the manual effort required to curate such models and reducing the system resource burdens in supporting manual curation of such models. The training may be performed by, for example, the model trainer 414 of FIG. 4.

The method 900 may include serializing the trained dialogue-related models and storing the models in a data store (block 908). The trained models may be serialized into a suitable format that can be loaded and utilized for multilingual dialogue-related functionality. The data store may correspond to, for example, the model data store 416 of FIG. 4.

Exemplary Chat Bot User Interfaces

The present techniques may be applied to enable many different multilingual applications. For example, FIG. 10A depicts an exemplary chat bot graphical user interface (GUI) 1000, according to an embodiment. The GUI 1000 includes respective first, second and third sections for greeting, privacy & rapport; triage, pathway & resource; and follow-up, farewell & loopback. The first section includes a role (who) and a conversation text portion. The GUI 1000 can be used to program a bot conversation, wherein the responses of the user are translated using the multilingual translation techniques discussed herein, and responses generated to the user using the response generation techniques discussed herein.

Figure 10B:
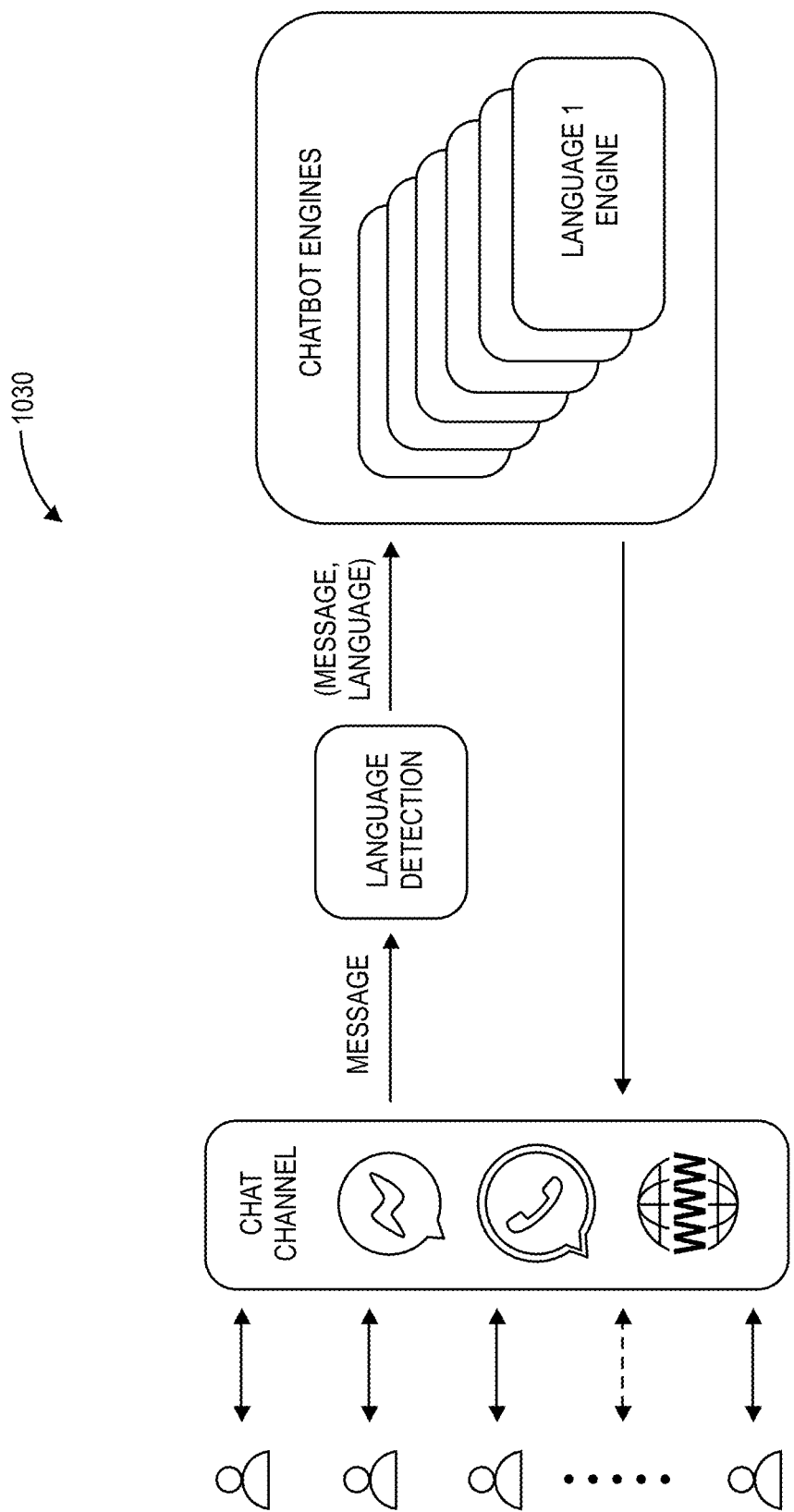
FIG. 10B depicts an exemplary chat bot architecture, according to the present disclosure.
Figure 10C:
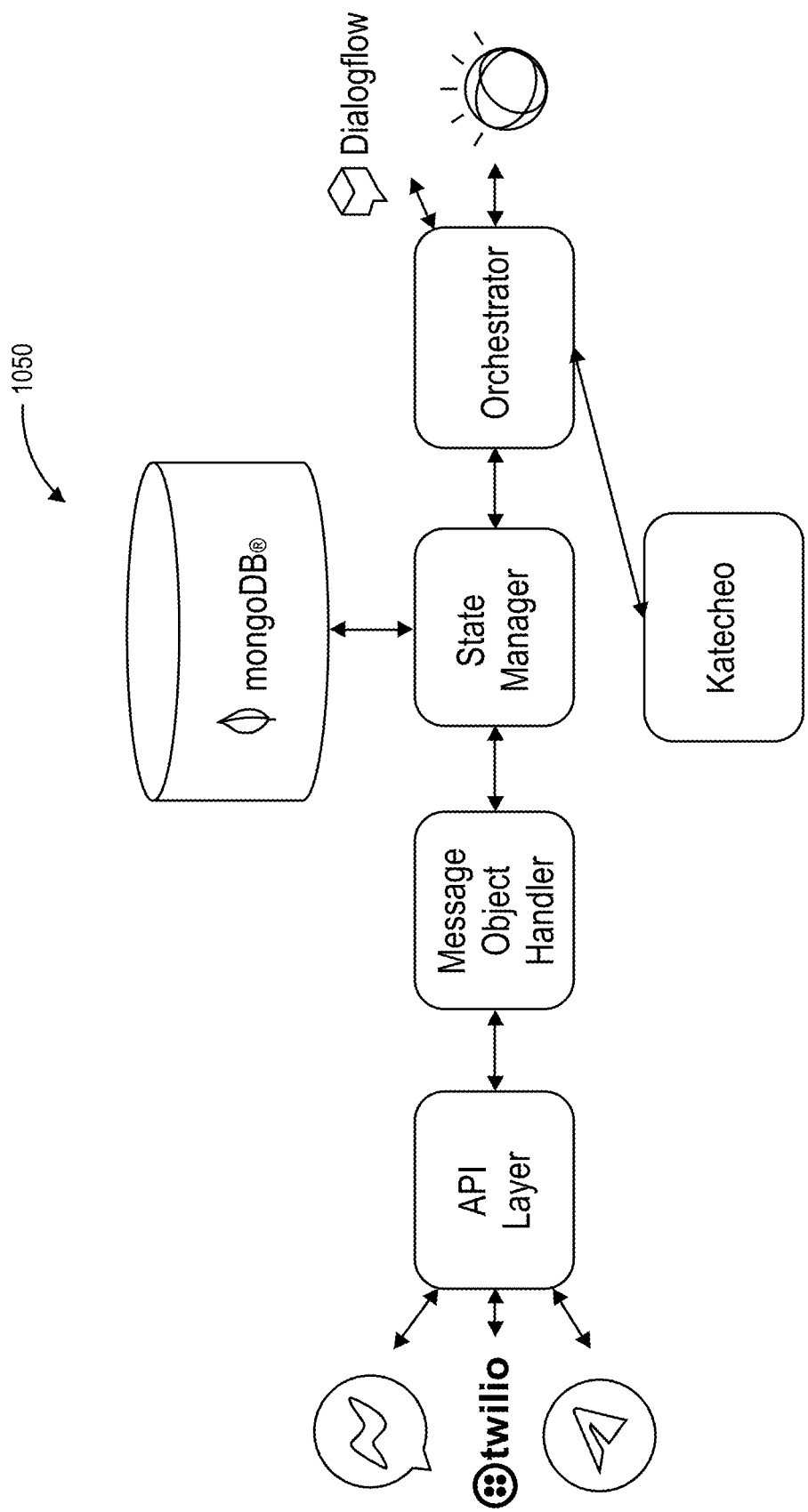
FIG. 10C depicts an exemplary chat bot architecture, according to the present disclosure.
Figure 10D:
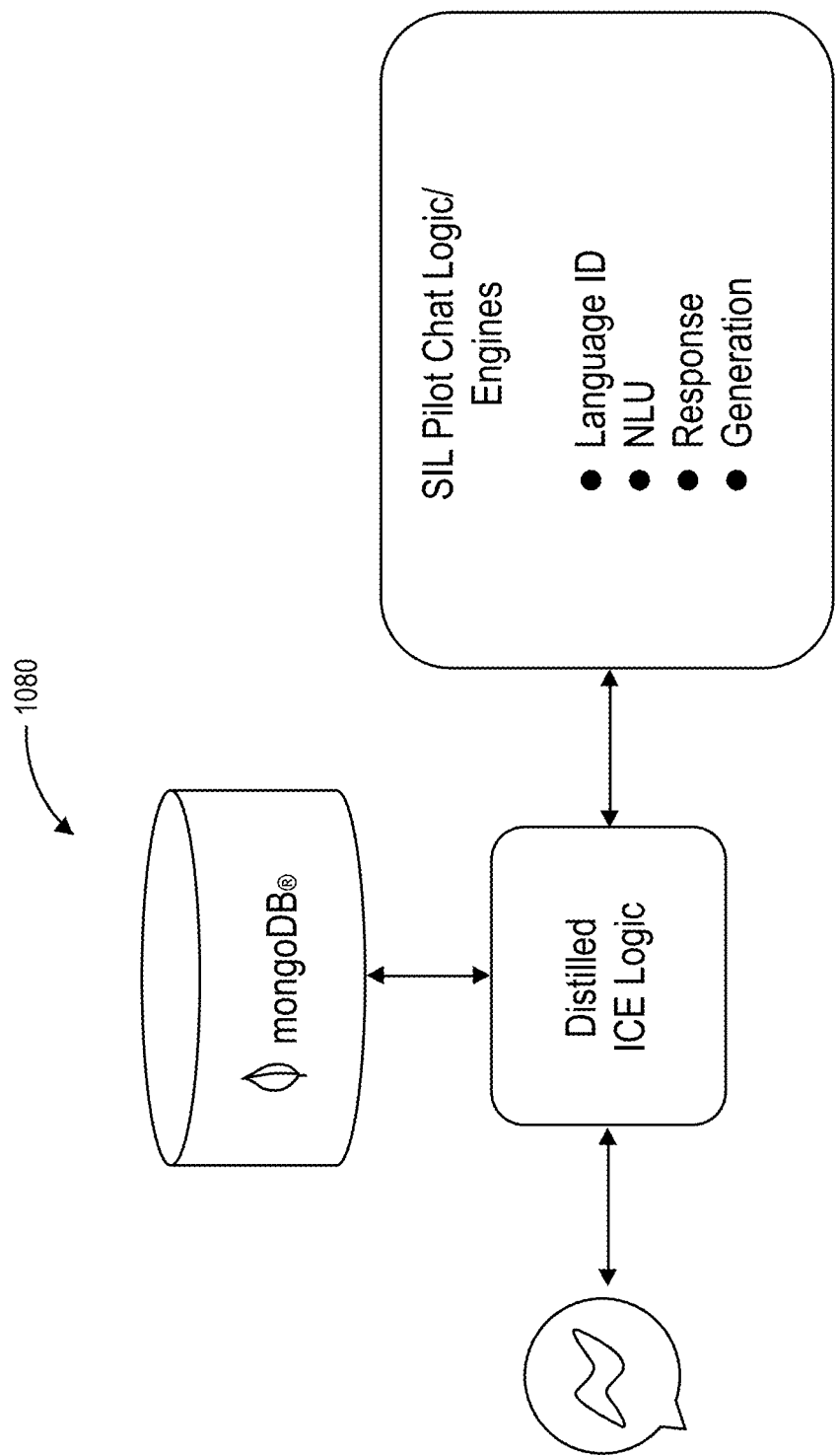
FIG. 10D depicts an exemplary chat bot architecture, according to the present disclosure.

FIG. 10B depicts an exemplary chat bot architectural diagram 1030, according to an embodiment. The diagram 1030 may be used to implement the GUI 1000 and its related functionality, for example. The language detection portion of the diagram 1030 may be performed by one of the language identification models 310 of FIG. 3, for example. FIGS. 10C and 10D represent additional exemplary chat bot architectures that may be used in some examples.

Exemplary Audio Processing Pipeline Architectures

Figure 11A:
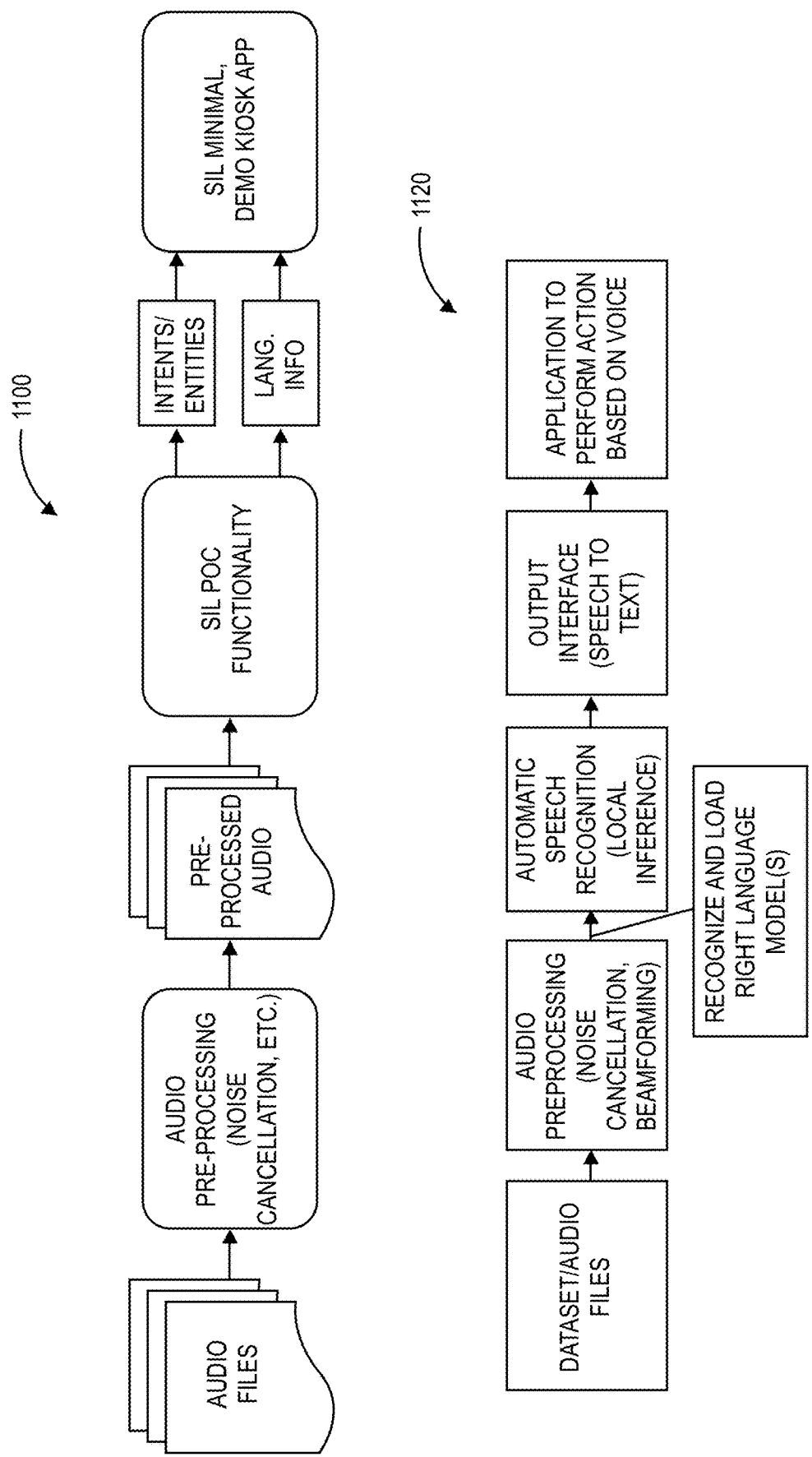
FIG. 11A depicts exemplary audio processing pipeline architectures, according to the present disclosure.

FIG. 11A depicts an exemplary audio processing pipeline architecture 1100, according to an embodiment. The architecture 1100 depicts receiving digital audio in the form of WAV signals, files, etc. and performing audio pre-processing on the received digital audio to generate pre-processed audio. The architecture 1100 includes processing the pre-processed digital audio further to generate one or more of 1) intents/entities, and 2) language identification information. The architecture 1100 depicts passing the generated intents/entities and/or language identification information to an application (e.g., a kiosk application).

FIG. 11A further depicts an exemplary audio processing pipeline architecture 1120 that may be implemented in some examples, wherein the digital audio input is in the form of a data set (e.g., an array of audio files) and the pre-processing steps include performing one or more of noise cancellation and/or beamforming. The architecture 1120 may include recognizing and/or loading language models corresponding to the input audio files and performing automatic speech recognition using a local inference technique. The architecture 1120 may include an output interface for converting speech in the digital audio input to text, and a software application for performing one or more action based on the digital audio.

Figure 11B:
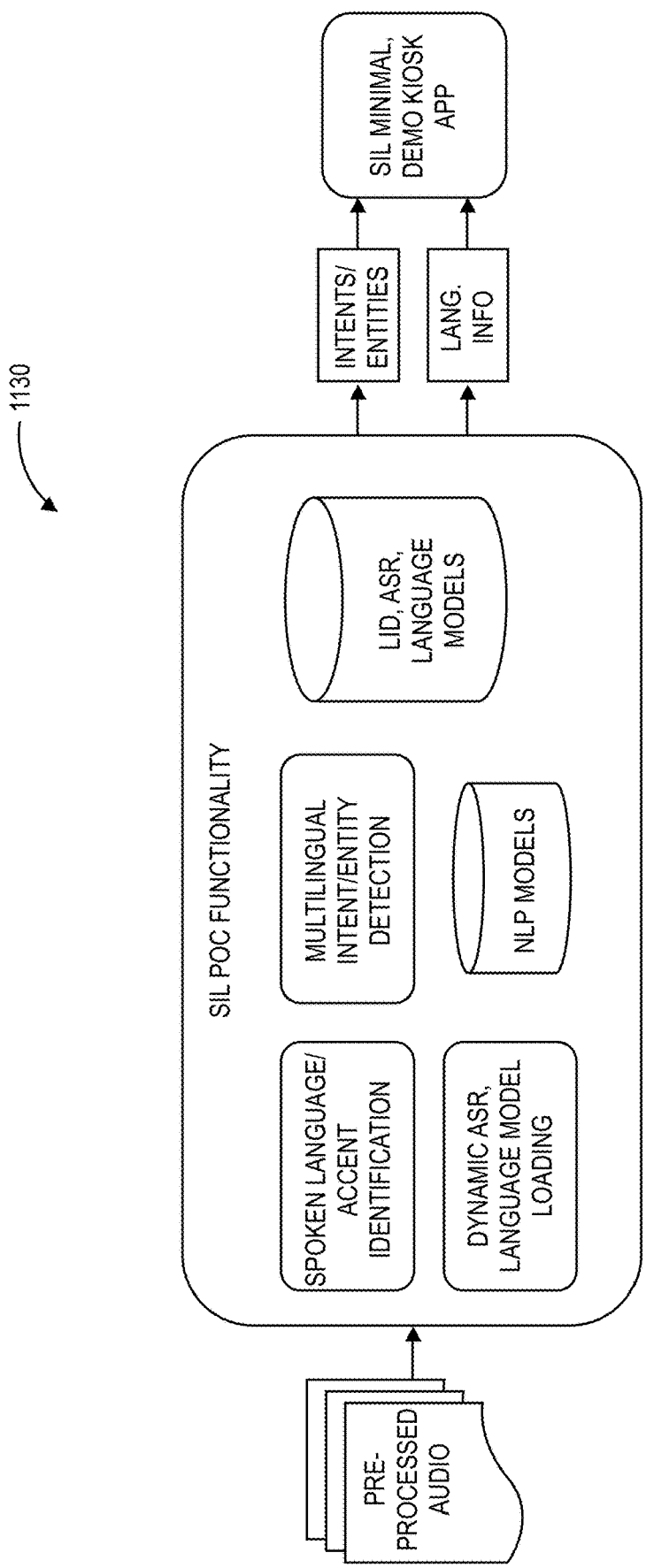
FIG. 11B depicts an exemplary audio processing pipeline architecture, according to the present disclosure.

FIG. 11B depicts an exemplary audio processing pipeline architecture 1130 that may correspond to one or both of the architecture 1100 and/or the architecture 1120, according to an embodiment. The architecture 1130 may include a pro-processed audio sink and functionality to perform a variety of functions including but not limited to spoken language identification, accent identification, dynamic automatic speech recognition language model loading, and multilingual intent/entity detection as discussed herein using a variety of NLP models, language identification models and/or automatic speech recognition models. The architecture may include one or both of intent/entity and/or language information sinks that may be accessed by a client computing application (e.g., a kiosk application) to provide results to the user.

Figure 12A:
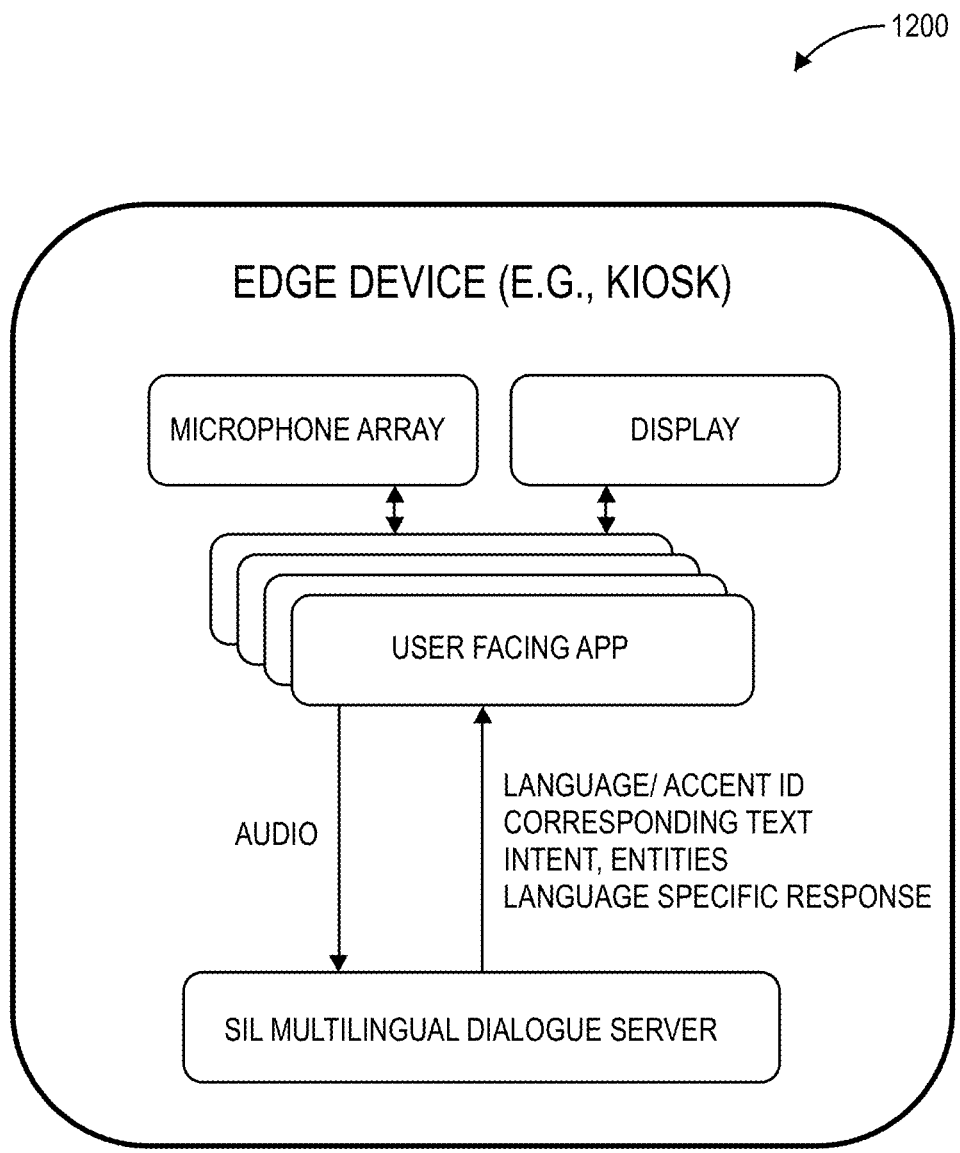
FIG. 12A depicts an exemplary edge device architectural diagram, according to the present disclosure.

FIG. 12A depicts an exemplary edge device architectural diagram 1200, according to an embodiment. The diagram 1200 includes a microphone array and display device configured in an edge device that may correspond to the edge device 100 or the edge device 200, in some examples. The diagram 1200 includes a user facing computing application that may be communicatively coupled to the microphone and display elements, and which may transmit digital audio input to a multilingual dialogue server that may correspond to the MDS 300 of FIG. 3, in some examples. The MDS may analyze the audio input as discussed herein and return to the user facing application one or more of language identification, accent identification, corresponding text, one or more intents, one or more entities, and one or more language-specific responses, in some examples. For example, the diagram 1200 may be used to implement the present techniques in a contactless kiosk system.

Figure 12B:
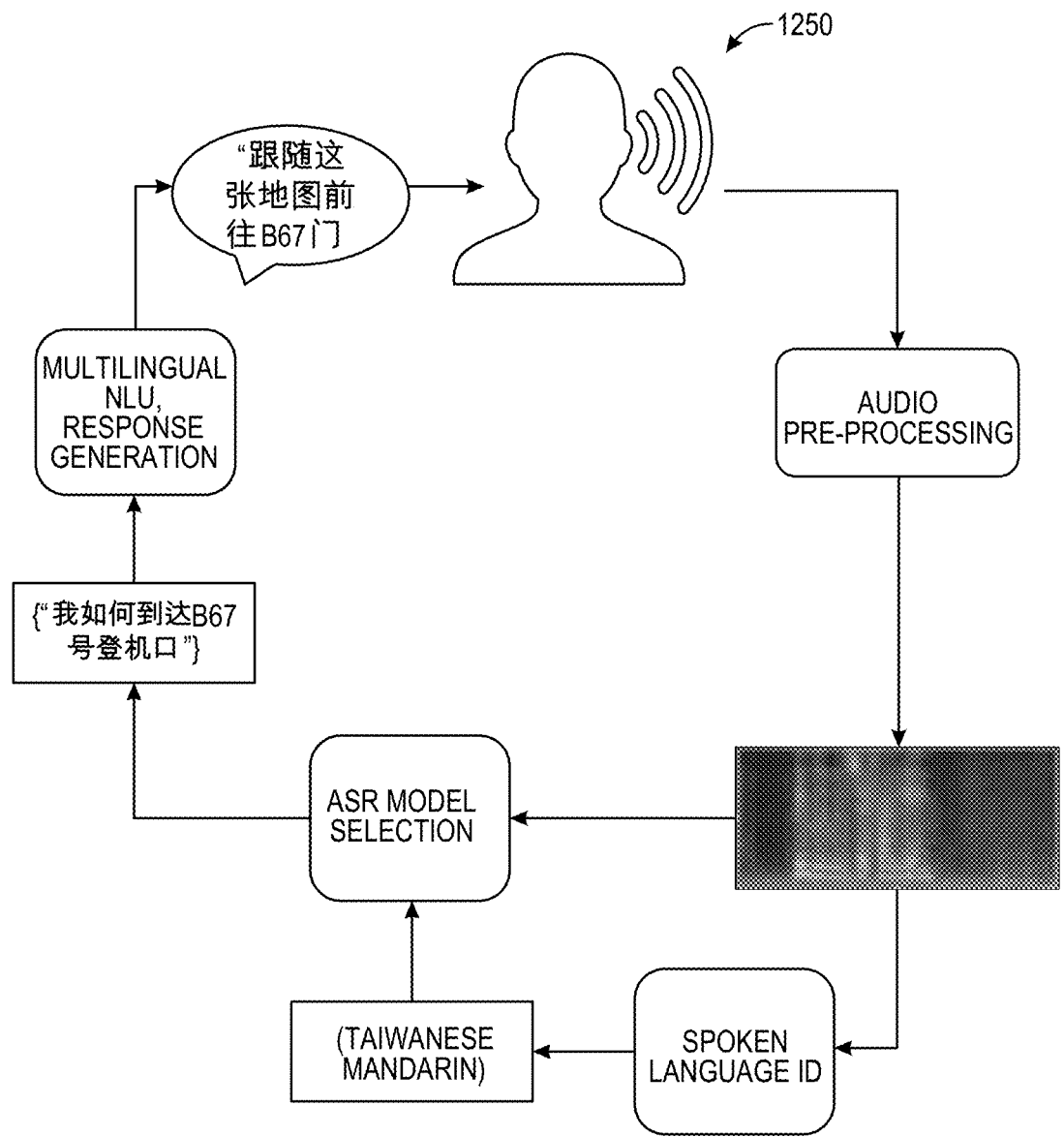
FIG. 12B depicts an exemplary data flow diagram, according to the present disclosure.

FIG. 12B depicts an exemplary data flow diagram 1250, according to an embodiment. The data flow diagram includes the user speaking an utterance captured as a digital audio signal. The data flow diagram 1250 depicts the audio signal being pre-processed into a spectrographic image (e.g., a Mel spectrogram). The data flow diagram 1250 depicts the digital audio signal being analyzed by 1) a spoken language identification model to generate an accented language identification of Taiwanese Mandarin; and/or an automatic speech recognition model directly. In some cases, the accented language identification may be analyzed as an additional input parameter of the automatic speech recognition model. The diagram 1250 depicts the automatic speech recognition model outputting a textual representation of the digital audio signal that is further analyzed by a multilingual natural language understanding model and response generation model, to generate a response that is conveyed back to the user.

FIG. 13 depicts exemplary shell conversational asset 1300 and a corresponding shell conversational asset 1350, according to an embodiment. The shell conversational asset 1300 includes a list of different textual representations of utterances for expressing multiple intents (greet, wash) in a first language (Amharic, in the depicted example). The corresponding shell conversational asset 1350 includes corresponding intents (greet, wash) for translating the intents of the corresponding shell conversational asset 1300 to a second language (English), and vice versa. The shell conversational asset 1300 may be used to create a dialog telling people how to wash their hands in multiple languages, as an example of multi-lingual dialogue. Here, a conversation creator creates data used to train an NLU model and designed a conversation using the greeting intent, wash intent, etc. To support other languages, a translators curates a shell conversation to create an example dialog with the same intents but translated to the other languages.

Expressing the data in the corresponding shell conversational asset 1300 and the corresponding shell conversational asset 1350 as shown allows an AI or ML model to be trained to convert utterances in the first language to the second language, and vice versa. The mapping between intents in the two languages allows the training to select from the correct utterances. It should be appreciated that the translation between the first and second language may not be a direct or literal translation. Rather, the ML models learn to associate phrases that are approximately but not precisely correspondent, both in syntactic and semantic terms.

The corresponding shell conversational asset 1350 depicts that an intent (e.g., restaurant) may be recursive, in that a bracketed variable "{restaurant}" may be used, in some examples, to refer to other entity groups and/or specific representations within the entity group (e.g., "McDonalds").

Exemplary Multilingual Dialogue Application Graphical User Interfaces

Figure 14A:
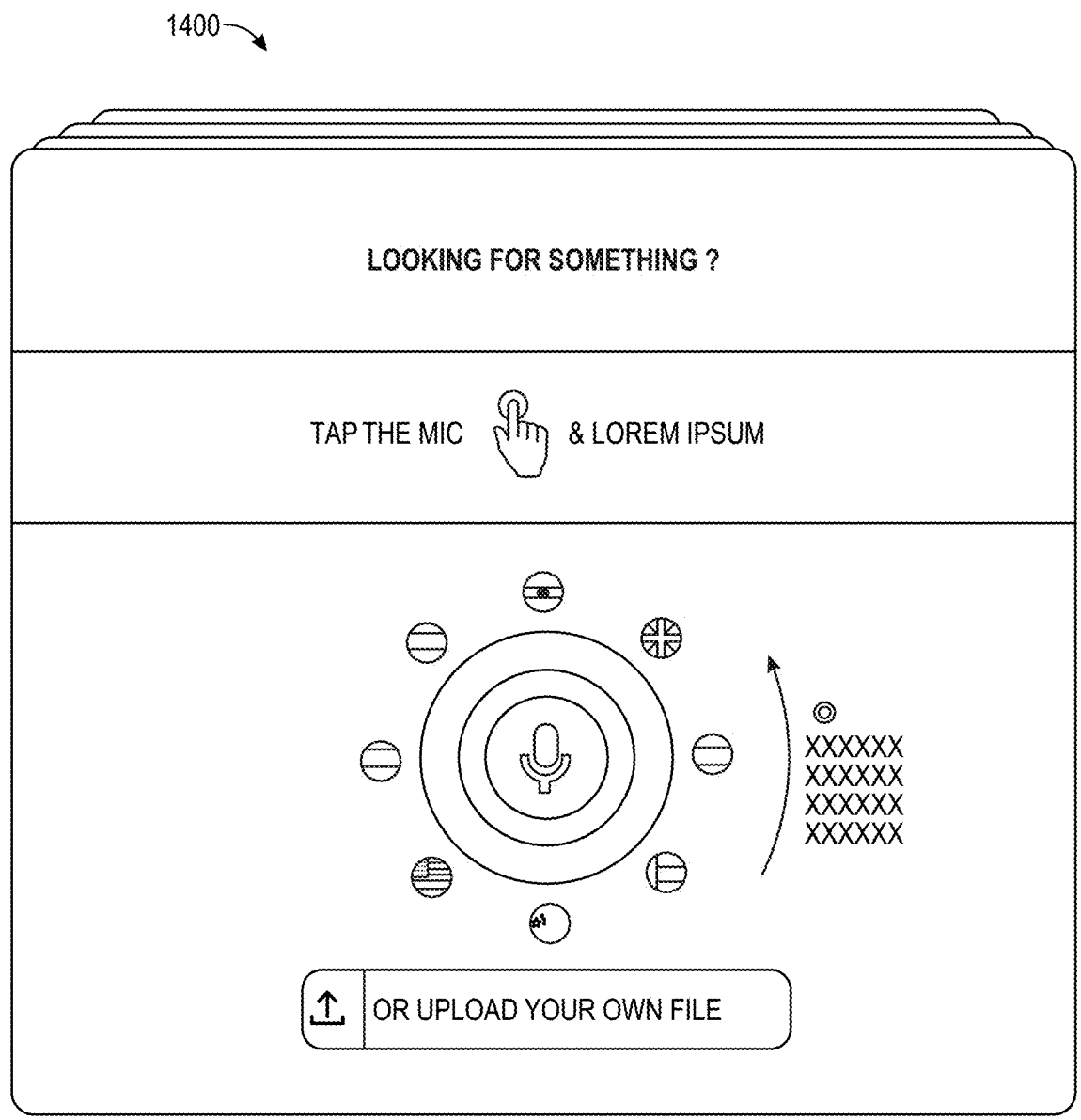
FIG. 14A depicts an exemplary digital audio capture graphical user interface, according to the present disclosure.

FIG. 14A depicts an exemplary digital audio capture graphical user interface 1400 of a computing application, according to an embodiment. The GUI 1400 may be activated by a user interacting with the computing application, either by physically contacting an input device of a computing device housing the application (e.g., the edge device 100) or by an utterance received by a microphone of the computing device (e.g., in a contactless kiosk implementation). The GUI 1400 may be displayed, for example, on a display screen of a kiosk in an airport. In this example, the display screen may include a plurality of flags representing countries/regions wherein a particular language and/or accent is spoken. In some examples, other graphical indications may be displayed that signal to a viewer that the kiosk supports multiple language inputs. For example, the GUI 1400 may display a prompt (e.g., "Looking for something?" as a carousel) that periodically displays a translated version of the prompt in one or more additional languages (e.g., que cherchez-vous?).

Figure 14B:
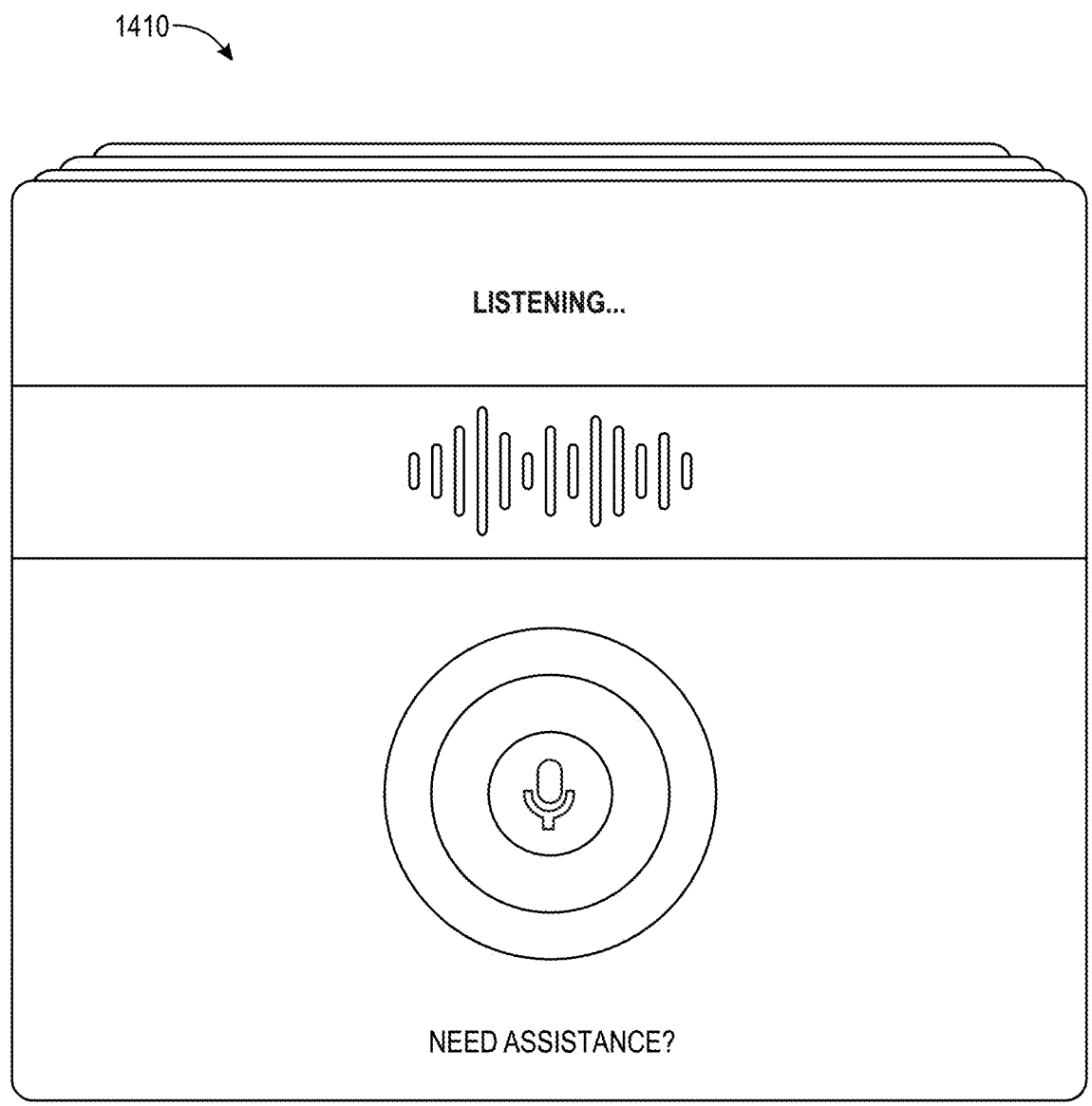
FIG. 14B depicts an exemplary digital audio input status graphical user interface, according to the present disclosure.

FIG. 14B depicts an exemplary digital audio input status graphical user interface 1410, according to an embodiment, that may be displayed by the application in response to the user's activation of/interaction with the GUI 1400. The GUI 1410 may be displayed unless/until the user begins to speak, and for a period of time after the user begins to speak, as determined by the application's processing of digital audio input corresponding to the user's utterance(s).

Figure 14C:
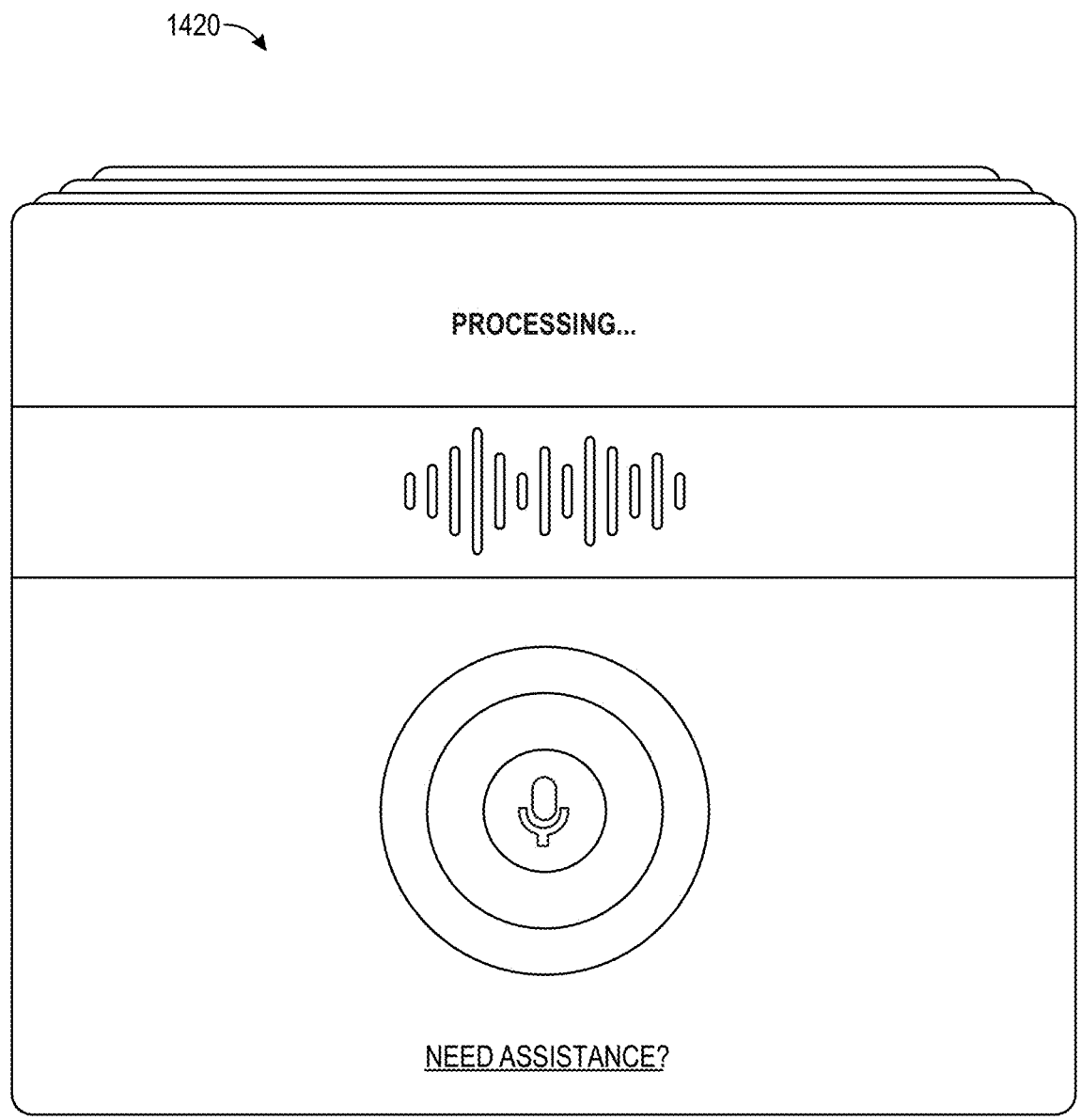
FIG. 14C depicts an exemplary digital audio input status graphical user interface, according to the present disclosure.

FIG. 14C depicts an exemplary digital audio input status graphical user interface 1420, according to an embodiment. The GUI 1420 may be displayed after the digital audio input is transmitted to a remote computing device (as in FIG. 2) or processed locally (as in FIG. 1). As discussed, the processing may include detecting a language by analyzing the digital audio input, configuring an automatic speech recognition functionality and a dialogue functionality based on the detected language by one or both of: (i) setting one or more function arguments, elements of metadata, or variables indicating the language corresponding to the input audio; and (ii) loading or causing the combinations of hardware, software, firmware, etc., to load a subset of ASR and dialogue-related models stored in a data store into a memory, etc. The processing may include configuring an automatic speech recognition functionality and a dialogue functionality based on the detected language and the detected accent, executing the automatic speech recognition functionality to convert the input digital audio into text, executing the configured dialogue functionality into a response to the input digital audio; and displaying the response to the digital audio input to the user, as shown in FIG. 14D.

Figure 14D:
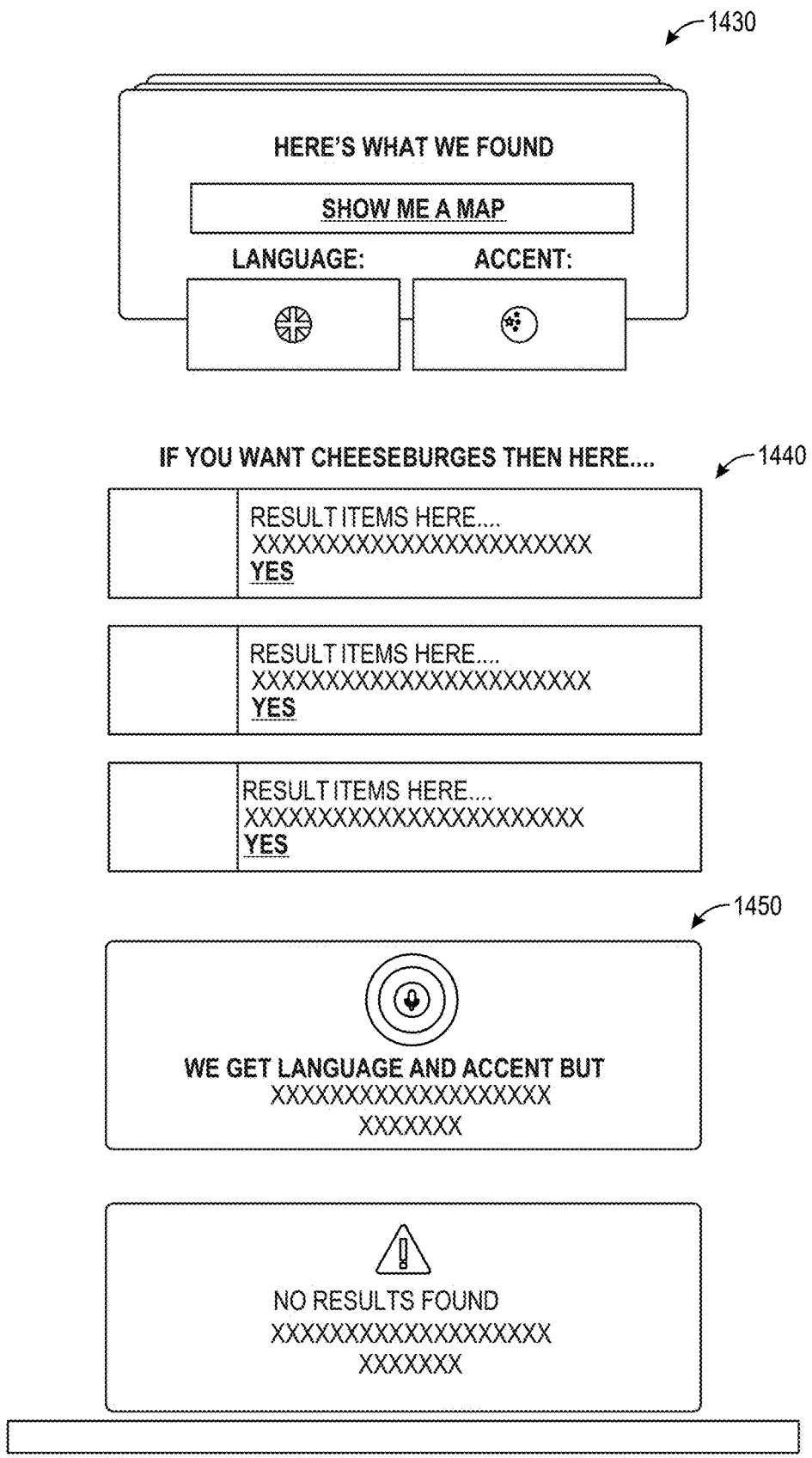
FIG. 14D depicts an exemplary digital audio input response graphical user interface, according to the present disclosure.
Figure 14E:
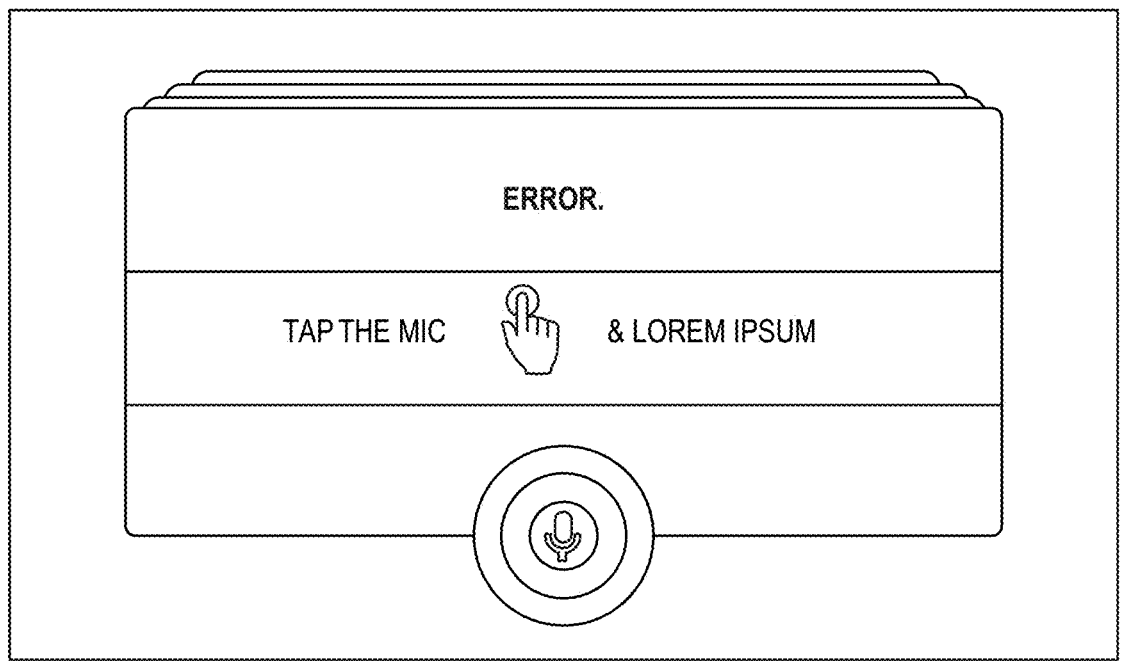
FIG. 14E depicts an exemplary digital audio input response graphical user interface, according to the present disclosure.

FIG. 14D depicts an exemplary digital audio input response graphical user interface 1400. The GUI 1400 may include a response to the input digital audio 1430, according to an embodiment, wherein the response may include the identified language and the identified accent. The GUI 1400 may include further processing of the response 1440, wherein the further processing includes information related to, or generated using, intent recognition, named entity recognition, sentiment analysis, reading comprehension, topic classification, text generation, text summarization, topical recommendations, etc. FIG. 14D includes further GUIs 1450 that may be displayed if/when the language and/or accent detection succeeds but no results are found. FIG. 14E depicts an exemplary digital audio input response graphical user interface, according to an embodiment including an error GUI 1460 that may be displayed when the user's query is not understood.

Dynamic Automatic Speech Recognition Examples

Figure 15:
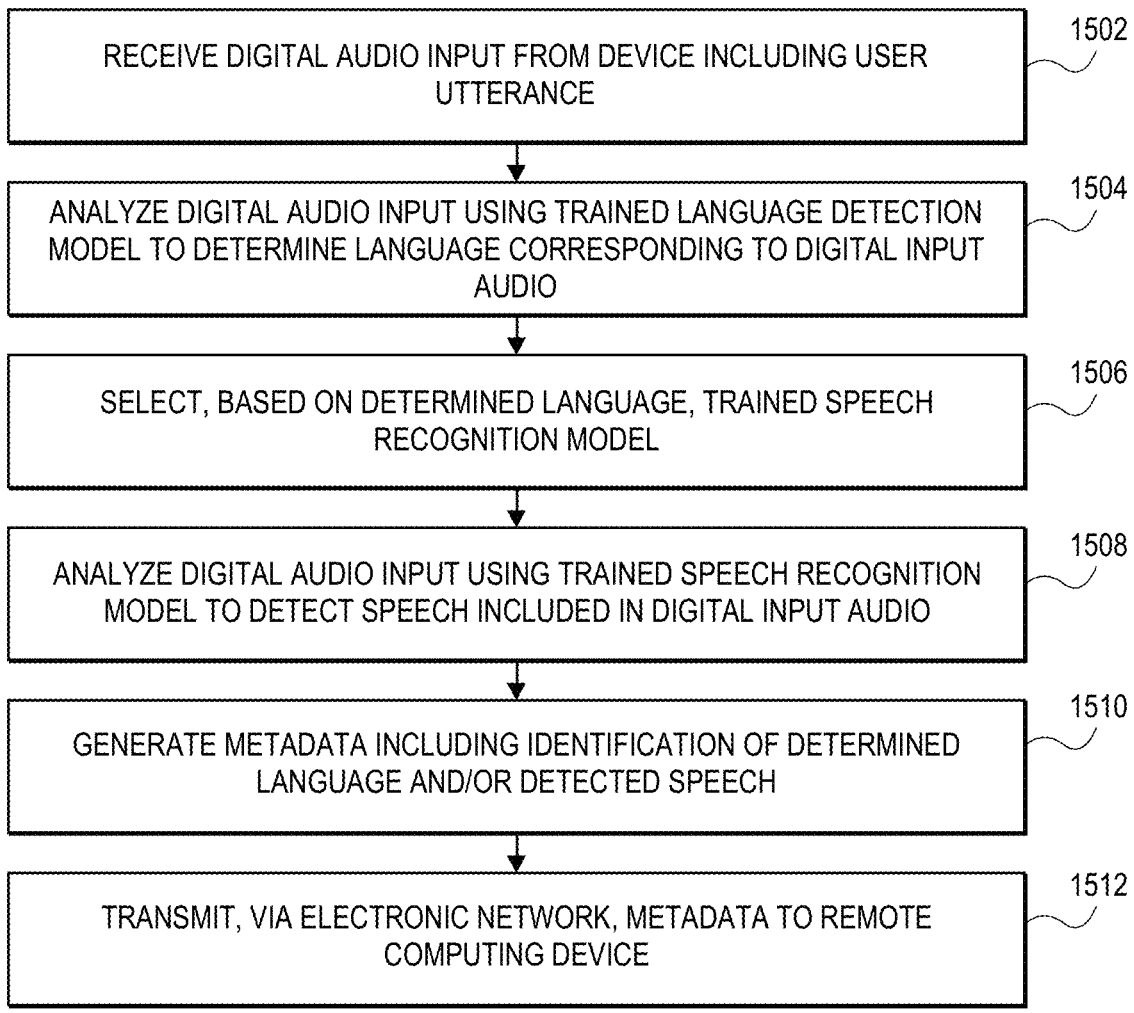
FIG. 15 depicts an exemplary computer-implemented method for performing dynamic automatic speech recognition, according to the present disclosure.

FIG. 15 depicts an exemplary computer-implemented method 1500 for performing dynamic automatic speech recognition (ASR).

The dynamic ASR method 1500 may include receiving digital audio input from at least one device including at least one utterance of a user (block 1502). For example, the edge device 100 of FIG. 1, the edge device 200 of FIG. 2, the MDS 300 of FIG. 3, and/or the edge device 720 of FIG. 7A may receive the digital audio input. For example, as shown in the audio processing pipeline architecture 1130 of FIG. 11B, digital audio input may be received as pre-processed audio. The digital audio input may correspond to user utterances, as depicted in exemplary data flow diagram 1250 of FIG. 12B. The digital audio input may be encoded any suitable digital format, such as WAV, MP3, FLAC, etc. The digital audio input may be captured by a microphone, such as a directional or unidirectional microphone (e.g., the microphone 206 of FIG. 2). The digital audio input may be captured by a microphone that is integral to a camera device (e.g., the camera device 722 of FIG. 7A). The digital audio input may be received via an real-time streaming protocol (RTSP) link from the camera device, as depicted in FIG. 7A.

The dynamic ASR method 1500 may include analyzing the digital audio input using a trained language detection model to determine one or more languages corresponding to the digital audio input (block 1504). The trained language detection model may correspond to the language identification models discussed above, for example, with respect to FIG. 5. The block 1504 may include language identification and/or accent identification. The output of the language detection process, as discussed, may be a language/accent class.

The dynamic ASR method 1500 may include selecting, based on the determined one or more languages, at least one trained speech recognition model (block 1506). As discussed above, one or more text recognition models may be trained and stored in a multilingual dialogue server (MDS) such as the MDS 102, the MDS 210, the MDS 300, etc. Selecting the trained speech recognition model may be performed by indexing the trained speech recognition models according to the language/accept class identified at block 1504. In some examples, the selecting may include configuring a model that is already loaded (e.g., by selecting a different accent of an already-loaded language model).

The dynamic ASR method 1500 may include analyzing the digital audio input using the trained speech recognition model to detect speech included in the digital audio input (block 1508). The trained speech recognition model may output a text transcript (e.g., a set of Unicode strings) corresponding to utterances included in the digital audio input. In some examples, the speech recognition model may be trained specifically to identify keywords. In other examples, a separate process may analyze the transcript to identify one or more keywords.

The dynamic ASR method 1500 may include generating a set of metadata including 1) an identification of the determined one or more languages and 2) the detected speech (block 1510). The set of metadata may be a structure data set as depicted in the metadata diagram 740 of FIG. 7B. The set of metadata may include collated output of multiple models, such as the trained language detection model and/or other models. Each of the collated model outputs may be encoded in a key/value format in the structured data.

The dynamic ASR method 1500 may include transmitting, via an electronic network, the set of metadata to a remote computing device (block 1512). For example, the remote computing device may correspond to the remote device 202 of FIG. 2, the message broker 710 of FIG. 7A, a remote MDS, etc. The method 1500 may transmit the metadata using an HTTP request, such as a POST request, a PUT request, etc. In some cases, the method 1500 may transmit the metadata using a message queue send function of a message broker software library. In some examples, the transmitting may include transmitting to the same device. For example, the remote device may be the same device as the edge device, as in FIG. 1. In that case, the transmitting may be from one module in the memory of the edge device to another module in memory, for example.

The dynamic ASR method 1500 may include analyzing the digital audio input using a trained sentiment analysis model to determine one or more speech sentiment indications. As discussed above, metadata generated may include determining a sentiment key/value pair including a sentiment probability. The dynamic ASR method 1500 may include the output of the sentiment analysis model in the generated metadata. Another application may analyze the metadata to determine the sentiment of utterances of users in the digital audio input. The output of any of the models used by the ASR method 1500 may be saved in a persistent storage device (e.g., a memory of an edge device).

The dynamic ASR method 1500 may include analyzing the digital audio input using a trained entity detection model to identify one or more entities included in the digital audio input and/or analyzing the digital audio input using a trained intent detection model to identify one or more intents included in the digital audio input. The dynamic ASR method 1500 may include generating a response to the utterance of the user based on the one or more identified entities and/or the one or more identified intents. For example, in the kiosk examples discussed above with respect to FIG. 1 and FIG. 12A, for example, the dynamic ASR method 1500 may determine that the utterance includes an entity and/or an intent. Based on the presence of the entity and/or the intent, the dynamic ASR method 1500 may generate a response to the user. Examples of responses are depicted in FIG. 14D. Examples of intents are depicted in FIG. 13. The dynamic ASR method 1500 may include causing the response to be displayed in a display device of a kiosk.

In some examples, the dynamic ASR method 1500 may include analyzing the received digital audio input using a trained incident detection model to identify one or more incidents corresponding to the digital audio input. The incidents including at least one of: 1) a glass break incident, 2) a raised voice incident, 3) a loud sound incident, 4) a scream incident, or 5) a gunshot incident. Incident detection is discussed above with respect to FIG. 7A, FIG. 7B and FIG. 7C. The dynamic ASR method 1500 may include storing the one or more incidents in one or more memories (e.g., the memory of an edge device). The dynamic ASR method 100 may include generating the set of metadata includes outputting a structured data representation of the one or more incidents. For example, FIG. 7B depicts a gunshot probability having a probability of 0.82. As discussed above, the present techniques may be deployed in environments that include unstable network connectivity. One of the advantages of the present techniques over conventional technique is built-in caching functionality. Specifically, the dynamic ASR method 1500 may include transmitting, via the electronic network, the set of metadata to the remote computing device one or both of (i) periodically, and (ii) immediately. As discussed, the metadata may be cached in a memory when a network is unavailable and transmitted only once a connection a remote computing device via the network becomes available.

Although the foregoing text sets forth a detailed description of numerous different examples, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative examples could be implemented, using either current technology or technology developed after the filing date of this patent, which would still fall within the scope of the claims. By way of example, and not limitation, the disclosure herein contemplates at least the following aspects:

1. An incident detection system, the incident detection system comprising: one or more processors; one or more memories; an electronic network; a streaming retail analytics application including computing instructions configured to be executed by the one or more processors; and a multilingual dialogue server (MDS) accessible, via the electronic network, by the streaming retail analytics application, comprising: an incident detection model trained to identify one or more incidents included in digital audio input; wherein the computing instructions of the streaming retail analytics application, when executed by the one or more processors, are configured to cause the one or more processors to: receive streaming digital audio input from at least one device including at least one utterance of a user; analyze the streaming digital audio input using the trained incident detection model to identify one or more incidents included in the digital audio input; store the one or more incidents in the one or more memories; generate, by analyzing the one or more stored incidents, a set of metadata; and transmit, via the electronic network, the set of metadata to a remote computing device.

2. The incident detection system of aspect 1, wherein the MDS further comprises at least one of: a sentiment analysis model trained to analyze digital audio input to determine speech sentiment indications, a language detection model trained to analyze digital audio input to determine one or more languages corresponding to the digital audio input, a speech detection model trained to analyze digital audio input to detect speech included in the digital audio input; or an entity detection model trained to analyze digital audio input to identify one or more entities included in the digital audio input; and wherein the computing instructions of the streaming retail analytics application, when executed by the one or more processors, are further configured to cause the one or more processors to: analyze the streaming digital audio input using the trained sentiment analysis model to determine one or more speech sentiment indications; analyze the streaming digital audio input using the trained language detection model to determine one or more languages corresponding to the digital audio input; analyze the streaming digital audio input using the trained speech detection model to detect speech included in the digital audio input; or analyze the streaming digital audio input using the trained entity detection model to identify one or more entities included in the digital audio input.

3. The incident detection system of aspect 1, wherein the system is operated in a retail store; and wherein the one or more identified incidents include at least one of: a glass break incident; a raised voice incident; a loud sound incident; or a gunshot incident.

4. The incident detection system of aspect 1, wherein the computing instructions of the streaming retail analytics application, when executed by the one or more processors, are further configured to cause the one or more processors to: receive the streaming digital audio input via a real-time streaming protocol (RTSP) link from a camera device.

5. The incident detection system of aspect 1, wherein the computing instructions of the streaming retail analytics application, when executed by the one or more processors, are further configured to cause the one or more processors to: transmit the set of metadata to a message queue in the remote computing device.

6. The incident detection system of aspect 1, wherein the computing instructions of the streaming retail analytics application, when executed by the one or more processors, are further configured to cause the one or more processors to: transmit, via the electronic network, the set of metadata to the remote computing device one or both of (i) periodically, and (ii) immediately.

7. The incident detection system of aspect 1, wherein the computing instructions of the streaming retail analytics application, when executed by the one or more processors, are further configured to cause the one or more processors to: generate the metadata in a JavaScript Object Notation (JSON) format.

8. A computer-implemented method for detecting incidents in streaming digital audio input, comprising: loading, via a streaming retail analytics application, an incident detection model trained to identify one or more incidents included in digital audio input; receiving, via an electronic network, streaming digital audio input from at least one device including at least one utterance of a user; analyzing, via one or more processors, the streaming digital audio input using the trained incident detection model to identify one or more incidents included in the digital audio input; storing, via the one or more processors, the one or more incidents in one or more memories; generating, by analyzing the one or more stored incidents via the one or more processors, a set of metadata; and transmitting, via the electronic network, the set of metadata to a remote computing device.

9. The computer-implemented method of aspect 8, further comprising: loading at least one of: a sentiment analysis model trained to analyze digital audio input to determine speech sentiment indications, a language detection model trained to analyze digital audio input to determine one or more languages corresponding to the digital audio input, a speech detection model trained to analyze digital audio input to detect speech included in the digital audio input; or an entity detection model trained to analyze digital audio input to identify one or more entities included in the digital audio input; and analyzing the streaming digital audio input using the trained sentiment analysis model to determine one or more speech sentiment indications, analyzing the streaming digital audio input using the trained language detection model to determine one or more languages corresponding to the digital audio input, analyzing the streaming digital audio input using the trained speech detection model to detect speech included in the digital audio input; or analyzing the streaming digital audio input using the trained entity detection model to identify one or more entities included in the digital audio input.

10. The computer-implemented method of aspect 8, wherein the method is performed in a retail store; and wherein analyzing, via the one or more processors, the streaming digital audio input using the trained incident detection model to identify the one or more incidents included in the digital audio input includes at least one of: identifying a glass break incident, identifying a raised voice incident, identifying a loud sound incident; or identifying a gunshot incident.

11. The computer-implemented method of aspect 8, wherein receiving, via the electronic network, the streaming digital audio input from the at least one device including the at least one utterance of the user includes receiving the streaming digital audio input via a real-time streaming protocol (RTSP) link from a camera device.

12. The computer-implemented method of aspect 8, wherein transmitting, via the electronic network, the set of metadata to the remote computing device includes transmitting the set of metadata to a message queue in the remote computing device.

13. The computer-implemented method of aspect 8, wherein transmitting, via the electronic network, the set of metadata to the remote computing device includes transmitting, via the electronic network, the set of metadata to the remote computing device one or both of (i) periodically, and (ii) immediately.

14. The computer-implemented method of aspect 8, wherein generating, by analyzing the one or more stored incidents via the one or more processors, the set of metadata includes generating the metadata in a JavaScript Object Notation (JSON) format.

15. A non-transitory computer readable medium containing program instructions that when executed, cause a computer to: load a trained incident detection model configured to analyze streaming digital audio input to identify incidents included in digital audio input; receive streaming digital audio input from at least one device including at least one utterance of a user; analyze the streaming digital audio input using the trained incident detection model to identify one or more incidents included in the digital audio input; store the one or more incidents in the one or more memories; generate, by analyzing the one or more stored incidents, a set of metadata; and transmit, via the electronic network, the set of metadata to a remote computing device.

16. The non-transitory computer readable medium of aspect 15, containing further program instructions that, when executed, cause a computer to: load at least one of: a sentiment analysis model trained to analyze digital audio input to determine speech sentiment indications, a language detection model trained to analyze digital audio input to determine one or more languages corresponding to the digital audio input, a speech detection model trained to analyze digital audio input to detect speech included in the digital audio input; or an entity detection model trained to analyze digital audio input to identify one or more entities included in the digital audio input; and analyze the streaming digital audio input using the trained sentiment analysis model to determine one or more speech sentiment indications; analyze the streaming digital audio input using the trained language detection model to determine one or more languages corresponding to the digital audio input; analyze the streaming digital audio input using the trained speech detection model to detect speech included in the digital audio input; or analyze the streaming digital audio input using the trained entity detection model to identify one or more entities included in the digital audio input.

17. The non-transitory computer readable medium of aspect 15, containing further program instructions that, when executed, cause a computer to: receive the streaming digital audio input via a real-time streaming protocol (RTSP) link from a camera device.

18. The non-transitory computer readable medium of aspect 15, containing further program instructions that, when executed, cause a computer to: transmit the set of metadata to a message queue in the remote computing device.

19. The non-transitory computer readable medium of aspect 15, containing further program instructions that, when executed, cause a computer to: transmit, via the electronic network, the set of metadata to the remote computing device one or both of (i) periodically, and (ii) immediately.

20. The non-transitory computer readable medium of aspect 15, containing further program instructions that, when executed, cause a computer to: generate the metadata in a JavaScript Object Notation (JSON) format.

21. A computer-implemented method for enabling contactless, multilingual dialogue interactions with a user, comprising: receiving a digital audio input signal including at least one utterance of the user; detecting a language by analyzing the digital audio input; configuring an automatic speech recognition functionality and a dialogue functionality based on the detected language by one or both of: (i) setting one or more function arguments, elements of metadata, or variables indicating the language corresponding to the input audio; and (ii) loading or causing the combinations of hardware, software, firmware, etc., to load a subset of ASR and dialogue-related models stored in a data store into a memory; executing the configured automatic speech recognition functionality to convert the input audio into text; executing the dialogue functionality to convert the text into a response to the digital audio input; and displaying the response to the digital audio input to the user.

22. A computer-implemented method for enabling contactless, multilingual dialogue interactions with a user, comprising: receiving a digital audio input signal including at least one utterance of the user; detecting a language and an accent of the language by analyzing the digital audio input; configuring an automatic speech recognition functionality and a dialogue functionality based on the detected language and the detected accent; executing the automatic speech recognition functionality to convert the input digital audio into text; executing the configured dialogue functionality into a response to the input digital audio; and displaying the response to the digital audio input to the user.

23. A computer-implemented method for optimizing artificial intelligence-driven language functionality on a device, comprising: receiving, via one or more microphones of the device, a digital audio input signal; detecting a language by analyzing the input digital audio; loading a subset of models into a memory of the device such that the device can execute language related functionality using the subset of models; utilizing the subset of models loaded into the memory to perform corresponding language functionality; and removing the subset of loaded models from the memory of the device.

24. A computer-implemented method for training dialogue-related models based on curated multilingual data, comprising: collecting and storing shell conversational assets; collecting and storing translated versions of the shell conversational assets; training dialogue-related models based on the collected and stored shell conversational assets and the collected and stored translated conversational assets; and serializing the trained dialogue-related models and storing the models in a data store.

Thus, many modifications and variations may be made in the techniques, methods, and structures described and illustrated herein without departing from the spirit and scope of the present claims. Accordingly, it should be understood that the methods and apparatus described herein are illustrative only and are not limiting upon the scope of the claims.

ADDITIONAL CONSIDERATIONS

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Unless a claim element is defined by reciting the word "means" and a function without the recital of any structure, it is not intended that the scope of any claim element be interpreted based upon the application of 35 U.S.C. § 112 (f).

The systems and methods described herein are directed to an improvement to computer functionality, and improve the functioning of conventional computers. Specific points of novel improvement identified in this specification include, but are not limited to: 1) dynamic configurability of ASR models based on spoken language identification and accent identification; 2) edge voice driven multilingual dialog that can be dynamically configured; 3) dynamically configuring a multi-lingual dialogue system with language detection; 4) dynamically configuring an edge device with language accent identification; and 5) management and curation of multi-lingual dialogue systems.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of ordinary skill in the art will appreciate still additional alternative structural and functional designs for the methods and systems described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed:

1. A dynamic automatic speech recognition (ASR) system, comprising:
    one or more processors;
    one or more memories;
    an electronic network;
    a digital audio processing application (app) including computing instructions configured to be executed by the one or more processors; and
    a multilingual dialogue server (MDS) accessible, via the electronic network, by the application, comprising:
        a language and accent detection model trained to analyze digital audio input to determine one or more languages and one or more accents corresponding to the digital audio input, and
        one or more language and accent-specific automatic speech recognition models, each trained to analyze digital audio input to detect respective speech included in digital audio;
    wherein the computing instructions of the app, when executed by the one or more processors, are configured to cause the one or more processors to:
    receive, at runtime, digital audio input from at least one device including at least one utterance of a user;
    analyze, at runtime, the digital audio input using the trained language and accent detection model to determine one or more languages and one or more accents corresponding to the digital audio input;
    based on the determined one or more languages and one or more accents, dynamically configure, at runtime, the MDS to use at least one trained compact speech recognition model by loading the at least one trained compact speech recognition model into the one or more memories, wherein the at least one trained compact speech recognition model replaces one dimensional (1D) convolutions with 1D time-channel separable convolutions; and
    cause, at runtime, the MDS to:
        download the at least one trained compact speech recognition model;
        analyze the digital audio input using the trained compact speech recognition model to detect speech included in the digital audio input;
        generate a set of metadata including 1) an identification of the determined one or more languages, 2) an identification of the determined one or more accents, and 3) the detected speech included in the digital audio input; and
        transmit, via the electronic network, the set of metadata to a remote computing device.

2. The dynamic ASR system of claim 1, wherein the computing instructions of the app, when executed by the one or more processors, are further configured to cause the one or more processors to:
    stream the digital audio input to the MDS via a real-time streaming protocol (RTSP) link from a camera device.

3. The dynamic ASR system of claim 1, wherein the computing instructions of the app, when executed by the one or more processors, are further configured to cause the one or more processors to:
    transmit the set of metadata to a message broker of the remote computing device.

4. The dynamic ASR system of claim 1,
    wherein the MDS further comprises:
        a sentiment analysis model trained to analyze digital audio input to determine one or more speech sentiment indications; and
    wherein the computing instructions of the app, when executed by the one or more processors, are further configured to cause the one or more processors to:
        analyze the digital audio input using the trained sentiment analysis model to determine one or more speech sentiment indications.

5. The dynamic ASR system of claim 1,
    wherein the MDS further comprises:
        an entity detection model trained to analyze digital audio input to identify one or more entities included in the digital audio input, and
        an intent detection model trained to analyze digital audio input to identify one or more intents included in the digital audio input; and
    wherein the computing instructions of the app, when executed by the one or more processors, are further configured to cause the one or more processors to:
        analyze the digital audio input using the trained entity detection model to identify one or more entities included in the digital audio input;
        analyze the digital audio input using the trained intent detection model to identify one or more intents included in the digital audio input;
        generate, based on one or both of 1) the one or more identified entities, and 2) the one or more identified intents, a response to the utterance of the user; and
        cause the response to be displayed in a display device of a kiosk.

6. The dynamic ASR system of claim 1,
wherein the MDS further comprises:
an incident detection model trained to identify one or more incidents included in digital audio input; and
wherein the computing instructions of the app, when executed by the one or more processors, are further configured to cause the one or more processors to:
analyze the received digital audio input using the trained incident detection model to identify one or more incidents corresponding to the digital audio input, the incidents including at least one of: 1) a glass break incident, 2) a raised voice incident, 3) a loud sound incident, 4) a scream incident, or 5) a gunshot incident;
store the one or more incidents in the one or more memories; and
generate the set of metadata by outputting a structured data representation of the one or more incidents.

7. The dynamic ASR system of claim 1, wherein the computing instructions of the app, when executed by the one or more processors, are further configured to cause the one or more processors to:
transmit, via the electronic network, the set of metadata to the remote computing device one or both of (i) periodically, and (ii) immediately.

8. A computer-implemented method for performing dynamic automatic speech recognition (ASR), comprising:
receiving, at runtime, digital audio input from at least one device including at least one utterance of a user;
analyzing, at runtime, the digital audio input using a trained language and accent detection model to determine one or more languages and one or more accents corresponding to the digital audio input;
based on the determined one or more languages and one or more accents, dynamically configure, at runtime, a MDS to use at least one trained compact speech recognition model by loading the at least one trained speech recognition model into one or more memories, wherein the at least one trained compact speech recognition model replaces one dimensional (1D) convolutions with 1D time-channel separable convolutions; and
causing, at runtime, a multilingual dialogue server (MDS) accessible via an electronic network to:
download the at least one trained compact speech recognition model;
analyze the digital audio input using the trained compact speech recognition model to detect speech included in the digital audio input;
generate a set of metadata including 1) an identification of the determined one or more languages, 2) an identification of the determined one or more accents, and 3) the detected speech; and
transmit via an electronic network, the set of metadata to a remote computing device.

9. The computer-implemented method of claim 8,
wherein the at least one device is a camera device, and further comprising:
receiving the digital audio input via a real-time streaming protocol (RTSP) link from the camera device.

10. The computer-implemented method of claim 8, wherein transmitting, via the electronic network, the set of metadata to the remote computing device includes transmitting the set of metadata to a message broker of the remote computing device.

11. The computer-implemented method of claim 8, further comprising:

analyzing the digital audio input using a trained sentiment analysis model to determine one or more speech sentiment indications.

12. The computer-implemented method of claim 8, further comprising:
analyzing the digital audio input using a trained entity detection model to identify one or more entities included in the digital audio input;
analyzing the digital audio input using a trained intent detection model to identify one or more intents included in the digital audio input;
generating, based on one or both of 1) the one or more identified entities, and 2) the one or more identified intents, a response to the utterance of the user; and
causing the response to be displayed in a display device of a kiosk.

13. The computer-implemented method of claim 8, further comprising:
analyzing the received digital audio input using a trained incident detection model to identify one or more incidents corresponding to the digital audio input, the incidents including at least one of: 1) a glass break incident, 2) a raised voice incident, 3) a loud sound incident, 4) a scream incident, or 5) a gunshot incident; and
storing the one or more incidents in one or more memories;
wherein generating the set of metadata includes outputting a structured data representation of the one or more incidents.

14. The computer-implemented method of claim 8, wherein
transmitting, via the electronic network, the set of metadata to the remote computing device includes transmitting, via the electronic network, the set of metadata to the remote computing device one or both of (i) periodically, and (ii) immediately.

15. A non-transitory computer readable medium containing program instructions that when executed, cause a computer to:
receive, at runtime, digital audio input from at least one device including at least one utterance of a user;
analyze, at runtime, the digital audio input using a trained language and accent detection model to determine one or more languages and one or more accents corresponding to the digital audio input;
based on the determined one or more languages and one or more accents, dynamically configure, at runtime, a MDS to use at least one trained compact speech recognition model by loading the at least one trained compact speech recognition model into one or more memories, wherein the at least one trained compact speech recognition model replaces one dimensional (1D) convolutions with 1D time-channel separable convolutions; and
cause, at runtime, the MDS to:
download the at least one trained compact speech recognition model;
analyze the digital audio input using the trained compact speech recognition model to detect speech included in the digital audio input;
generate a set of metadata including 1) an identification of the determined one or more languages, 2) an identification of the determined one or more accents, and 3) the detected speech; and
transmit, via an electronic network, the set of metadata to a remote computing device.

16. The non-transitory computer readable medium of claim 15, containing further program instructions that, when executed, cause a computer to:
    stream the digital audio input to the MDS via a real-time streaming protocol (RTSP) link from a camera device.

17. The non-transitory computer readable medium of claim 15, containing further program instructions that, when executed, cause a computer to:
    transmit the set of metadata to a message broker of the remote computing device.

18. The non-transitory computer readable medium of claim 15, containing further program instructions that, when executed, cause a computer to:
    analyze the digital audio input using a trained sentiment analysis model to determine one or more speech sentiment indications.

19. The non-transitory computer readable medium of claim 15, containing further program instructions that, when executed, cause a computer to:
    analyze the digital audio input using a trained entity detection model to identify one or more entities included in the digital audio input;
    analyze the digital audio input using a trained intent detection model to identify one or more intents included in the digital audio input;
    generate, based on one or both of 1) the one or more identified entities, and 2) the one or more identified intents, a response to the utterance of the user; and
    cause the generated response to be displayed in a display device of a kiosk.

20. The non-transitory computer readable medium of claim 15, containing further program instructions that, when executed, cause a computer to:
    analyze the received digital audio input using a trained incident detection model to identify one or more incidents corresponding to the digital audio input, the incidents including at least one of: 1) a glass break incident, 2) a raised voice incident, 3) a loud sound incident, 4) a scream incident, or 5) a gunshot incident;
    store the one or more incidents in the one or more memories; and
    generate the set of metadata by outputting a structured data representation of the one or more incidents.

* * * * *